(12) United States Patent
Jin

(10) Patent No.: US 7,880,338 B2
(45) Date of Patent: Feb. 1, 2011

(54) POWER TRANSMISSION CONTROL DEVICE, POWER TRANSMITTING DEVICE, POWER RECEIVING DEVICE, NON-CONTACT POWER TRANSMISSION SYSTEM, ELECTRONIC INSTRUMENT, SECONDARY COIL POSITION DETECTION METHOD, AND PRIMARY COIL POSITIONING METHOD

(75) Inventor: Mikimoto Jin, Chino (JP)

(73) Assignee: Seiko Epson Corporation, Tokyo (JP)

( * ) Notice: Subject to any disclaimer, the term of this patent is extended or adjusted under 35 U.S.C. 154(b) by 100 days.

(21) Appl. No.: 12/236,192

(22) Filed: Sep. 23, 2008

(65) Prior Publication Data

US 2009/0079269 A1    Mar. 26, 2009

(30) Foreign Application Priority Data

Sep. 26, 2007 (JP) ............................. 2007-249442

(51) Int. Cl.
*H01F 27/42* (2006.01)
(52) U.S. Cl. ...................................... 307/104
(58) Field of Classification Search ............. 307/104; 320/108; 355/72; 323/355; 336/115
See application file for complete search history.

(56) References Cited

U.S. PATENT DOCUMENTS

| 6,803,744 | B1 * | 10/2004 | Sabo ......................... 320/108 |
| 2007/0126583 | A1 * | 6/2007 | Maniwa et al. ........... 340/572.2 |
| 2010/0033156 | A1 * | 2/2010 | Abe et al. ................... 323/305 |
| 2010/0072825 | A1 * | 3/2010 | Azancot et al. ............. 307/104 |

FOREIGN PATENT DOCUMENTS

| JP | A-9-182212 | 7/1997 |
| JP | A-2000-92615 | 3/2000 |
| JP | A-2001-155944 | 6/2001 |
| JP | A-2002-152997 | 5/2002 |
| JP | A-2003-284264 | 10/2003 |
| JP | A-2005-6460 | 1/2005 |
| JP | A-2006-60909 | 3/2006 |
| WO | WO 2007029438 A1 * | 3/2007 |

OTHER PUBLICATIONS

U.S. Appl. No. 12/237,733; in the name of Mikimoto Jin, filed Sep. 25, 2008.
U.S. Appl. No. 12/237,449; in the name of Mikimoto Jin, filed Sep. 25, 2008.
U.S. Appl. No. 12/237,450; in the name of Mikimoto Jin, filed Sep. 25, 2008.

* cited by examiner

*Primary Examiner*—Jared J Fureman
*Assistant Examiner*—Daniel Cavallari
(74) *Attorney, Agent, or Firm*—Oliff & Berridge, PLC

(57) ABSTRACT

A power transmission control device used for a non-contact power transmission system includes a power-transmitting-side control circuit that controls power transmission to a power receiving device, a calculation circuit that calculates the position of a secondary coil by performing given calculations, and an actuator control circuit that controls the operation of an actuator, the actuator moving the position of the primary coil in an XY plane, the actuator control circuit scanning the primary coil for detecting the position of the secondary coil L2, the calculation circuit performing the given calculations based on data acquired by the scan for detecting the position of the secondary coil L2 to determine the position of the secondary coil L2, and the actuator control circuit moving the primary coil L1 so that the position of the primary coil coincides with the calculated position of the secondary coil.

9 Claims, 16 Drawing Sheets

FIG. 9A
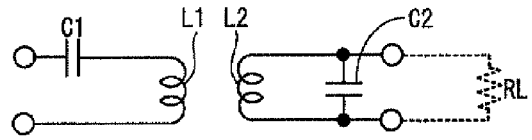
FIG. 9B
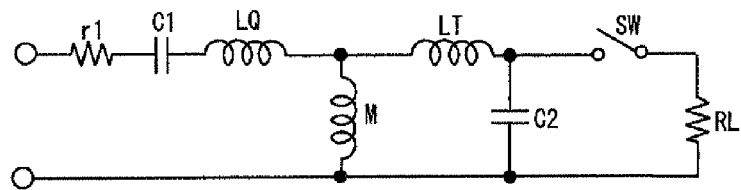
FIG. 9C
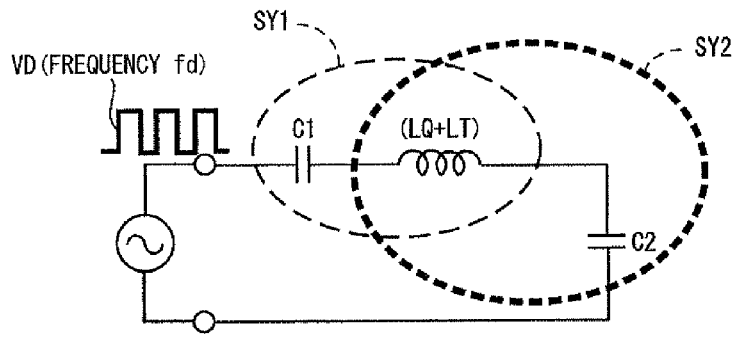
FIG. 9E
FIG. 9D
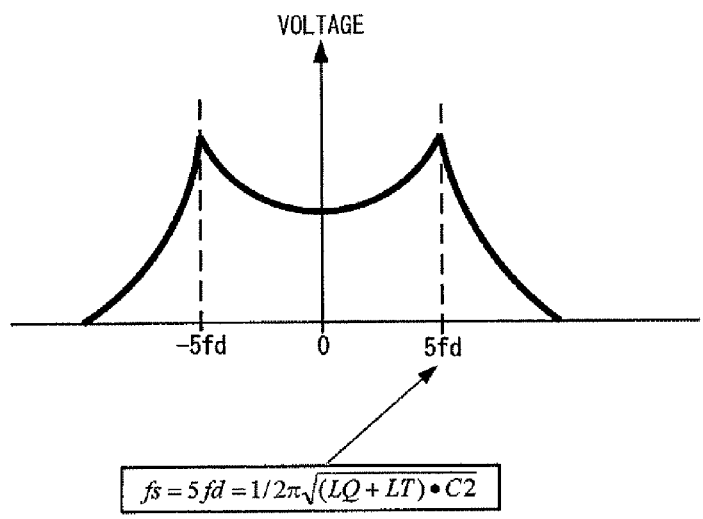
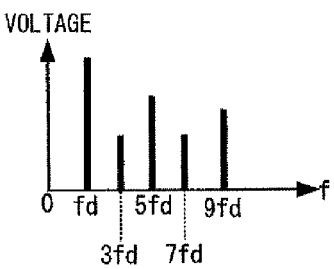
$$fs = 5fd = 1/2\pi\sqrt{(LQ + LT) \cdot C2}$$

POWER TRANSMISSION CONTROL DEVICE, POWER TRANSMITTING DEVICE, POWER RECEIVING DEVICE, NON-CONTACT POWER TRANSMISSION SYSTEM, ELECTRONIC INSTRUMENT, SECONDARY COIL POSITION DETECTION METHOD, AND PRIMARY COIL POSITIONING METHOD

Japanese Patent Application No. 2007-249442 filed on Sep. 26, 2007, is hereby incorporated by reference in its entirety.

BACKGROUND

The present invention relates to a power transmission control device, a power transmitting device, a power receiving device, a non-contact power transmission system, an electronic instrument, a secondary coil position detection method, a primary coil positioning method, and the like.

In recent years, non-contact power transmission (contactless power transmission) that utilizes electromagnetic induction to enable power transmission without metal-to-metal contact has attracted attention. As application examples of non-contact power transmission, charging a portable telephone, charging a household appliance (e.g., cordless telephone handset or watch), and the like have been proposed.

JP-A-2006-60909 discloses a non-contact power transmission device using a primary coil and a secondary coil, for example.

JP-A-2005-6460 discloses technology that detects misalignment of a primary coil and a secondary coil in a non-contact power transmission system. According to the technology disclosed in JP-A-2005-6460, whether or not the relative positional relationship between the primary coil and the secondary coil is correct is detected based on an output voltage of a rectifier circuit of a power receiving device. When the relative positional relationship between the primary coil and the secondary coil is correct, a light-emitting diode (LED) is turned ON to notify the user that the relative positional relationship between the primary coil and the secondary coil is correct. When the relative positional relationship between the primary coil and the secondary coil is incorrect, the LED is not turned ON. In this case, the user manually adjusts the positional relationship between the primary coil and the secondary coil.

In order to accurately position the primary coil and the secondary coil in a non-contact power transmission system, it is desirable to use a dedicated power transmitting instrument (i.e., a primary-side electronic instrument including a power transmitting device) for a secondary-side instrument including a power receiving device, for example. In this case, since it is necessary to provide a dedicated power transmitting stand corresponding to each secondary-side instrument, the versatility of the power transmitting instrument cannot be ensured.

For example, when charging a battery of a portable terminal utilizing a non-contact power transmission system, the external shape (design) of the portable terminal and the secondary coil installation position generally differ depending on the manufacturer even if the size of the portable terminal is identical. Therefore, it is difficult to deal with a plurality of portable terminals produced by different manufacturers using one power transmitting instrument (charger).

Moreover, different types of terminals (e.g., portable telephone terminal and PDA terminal) differ in size, shape (design), and secondary coil installation position. Therefore, it is difficult to deal with different types of terminals using one power transmitting instrument.

If a portable terminal can be charged merely by placing the portable terminal in a given area of a structure (e.g., desk) having a flat surface without using a dedicated power transmitting instrument, the convenience of a non-contact power transmission system can be significantly improved. However, the accurate position of a secondary coil of a portable terminal placed at an approximate position in a given area cannot be determined for the above-described reasons. Therefore, such a next-generation non-contact power transmission system cannot be implemented by the current technology.

According to the technology disclosed in JP-A-2005-6460, although the user can be notified whether or not the primary coil and the secondary coil are positioned correctly, the user must manually adjust the positional relationship between the primary coil and the secondary coil when the positional relationship is incorrect.

According to the technology disclosed in JP-A-2005-6460, since occurrence of mispositioning is determined based on the output from the rectifier circuit of the power receiving device, power must be continuously transmitted from the power transmitting device to the power receiving device. Moreover, the power transmitting device cannot voluntarily acquire coil misalignment information.

SUMMARY

According to one aspect of the invention, there is provided a power transmission control device that controls power transmission of a power transmitting device of a non-contact power transmission system, the non-contact power transmission system transmitting power from the power transmitting device to a power receiving device via non-contact power transmission through a primary coil and a secondary coil that are electromagnetically coupled, the power transmission control device comprising:

a power-transmitting-side control circuit that controls power transmission to the power receiving device;

a calculation circuit that calculates the position of the secondary coil by performing given calculations; and an actuator control circuit that controls the operation of an actuator, the actuator moving the position of the primary coil in an XY plane, the actuator control circuit scanning the primary coil to detect the position of the secondary coil;

the calculation circuit performing the given calculations based on data acquired by scanning of the primary coil to detect the position of the secondary coil to determine the position of the secondary coil; and the actuator control circuit moving the primary coil so that the position of the primary coil coincides with the calculated position of the secondary coil.

According to another aspect of the invention, there is provided a power transmitting device comprising:

the above power transmission control device; and a primary coil.

According to another aspect of the invention, there is provided a power receiving device comprising:

a secondary coil; and a capacitor connected to the secondary coil, a capacitance of the capacitor being set so that a resonant circuit that resonates with a harmonic of a drive frequency of a primary coil is formed by the capacitor and a leakage inductance when a center of the primary coil and a center of the secondary coil are positioned at a given distance R (R≧0).

According to another aspect of the invention, there is provided a non-contact power transmission system comprising:
the above power transmitting device; and
the above power receiving device.

According to another aspect of the invention, there is provided an electronic instrument comprising the above power receiving device.

According to another aspect of the invention, there is provided a secondary coil position detection method for a non-contact power transmission system that transmits power from a power transmitting device to a power receiving device via non-contact power transmission through a circular primary coil and a circular secondary coil that are electromagnetically coupled, a capacitor being connected to the secondary coil, and a resonant circuit that resonates with a harmonic of a drive frequency of the primary coil being formed by the capacitor and a leakage inductance when the primary coil and the secondary coil are electromagnetically coupled in a state in which a center of the primary coil and a center of the secondary coil are positioned at a given distance, the method comprising:

moving the primary coil along a first axis that intersects the secondary coil to perform a first scan to detect the position of the secondary coil;

calculating coordinates of a midpoint of a line segment that connects two points at which the peak of a detection signal of a harmonic detection circuit is obtained during the first scan;

moving the primary coil along a second axis that perpendicularly intersects the first axis and passes through the midpoint calculated during the first scan to perform a second scan to detect the position of the secondary coil; and calculating coordinates of a midpoint of a line segment that connects two points at which the peak of the detection signal of the harmonic detection circuit is obtained during the second scan to detect the position of the secondary coil.

According to another aspect of the invention, there is provided a primary coil positioning method comprising:

moving a primary coil to the position of a secondary coil detected by the above secondary coil position detection method to position the primary coil to a position of the secondary coil.

BRIEF DESCRIPTION OF THE DRAWINGS

FIGS. 9A to 9E are views illustrative of the configuration and the operation of a harmonic resonant circuit.

DESCRIPTION OF EXEMPLARY EMBODIMENTS

Figure 1A:
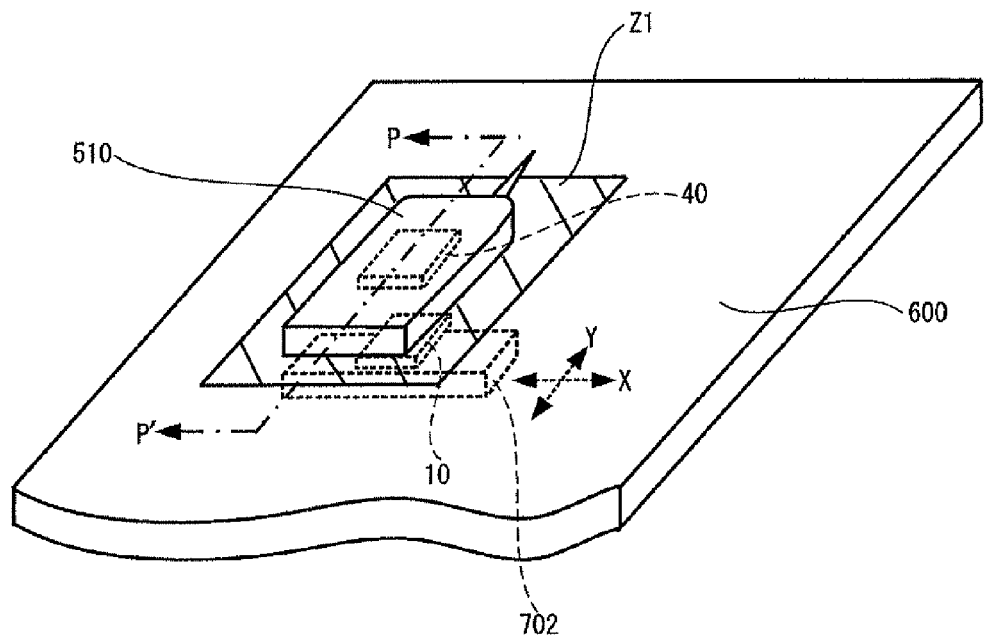
FIGS. 1A and 1B are views showing an example of an application of a non-contact power transmission system utilizing the invention.

Several embodiments of the invention may enable a primary coil and a secondary coil to be automatically positioned so that the relative positional relationship between the primary coil and the secondary coil can be automatically optimized regardless of the manufacturer, size, type, design, and the like of a secondary-side instrument, for example. This may implement a highly versatile power transmitting device (primary-side device), and may also implement a next-generation non-contact power transmission system, for example. Moreover, the coil position may be detected with extremely high accuracy utilizing the harmonic resonance of a drive frequency of a primary coil so that a power receiving device having a novel configuration that implements harmonic resonance may be obtained, for example.

(1) According to one embodiment of the invention, there is provided a power transmission control device that controls power transmission of a power transmitting device of a non-contact power transmission system, the non-contact power transmission system transmitting power from the power transmitting device to a power receiving device via non-contact power transmission through a primary coil and a secondary coil that are electromagnetically coupled, the power transmission control device comprising:

a power-transmitting-side control circuit that controls power transmission to the power receiving device;

a calculation circuit that calculates the position of the secondary coil by performing given calculations; and an actuator control circuit that controls the operation of an actuator, the actuator moving the position of the primary coil in an XY plane, the actuator control circuit scanning the primary coil to detect the position of the secondary coil;

the calculation circuit performing the given calculations based on data acquired by scanning of the primary coil to detect the position of the secondary coil to determine the position of the secondary coil; and the actuator control circuit moving the primary coil so that the position of the primary coil coincides with the calculated position of the secondary coil.

According to this embodiment, the power transmission control device (e.g., power transmitting control IC) provided in the power transmitting device calculates the position of the secondary coil, and drives the actuator to move the primary coil to the calculated position of the secondary coil to accurately position the primary coil and the secondary coil.

(2) In the power transmission control device, the power transmission control device may include a harmonic detection circuit that detects a harmonic signal of a drive frequency of the primary coil;

a resonant circuit that resonates with a harmonic of the drive frequency of the primary coil may be formed when the primary coil and the secondary coil are electromagnetically coupled in a state in which a center of the primary coil and a center of the secondary coil are positioned at a given distance, the harmonic detection circuit may detect a resonance peak of the harmonic of the drive frequency of the primary coil due to the resonance of the resonant circuit; and the calculation circuit may perform the given calculations based on coordinate position data when the resonance peak of the harmonic has been obtained from the harmonic detection circuit to calculate the position of the center of the secondary coil.

According to this embodiment, the harmonic resonant circuit is formed when the center of the primary coil and the center of the secondary coil are positioned at a given distance (R: R>0) to obtain the harmonic resonance peak. This may be implemented by setting the capacitance of the resonant capacitor of the secondary coil to resonate with a leakage inductance when the center of the primary coil and the center of the secondary coil are positioned at the given distance R, for example.

The harmonic detection circuit provided in the power transmission control device detects the harmonic resonance peak of the drive frequency of the primary coil. For example, when the resonance frequency of the primary-side resonant circuit including the primary coil is referred to as fp, the drive frequency of the primary coil is generally set at a frequency (fd) away from the resonance frequency (fp) taking operational stability into consideration.

When the drive signal of the primary coil is a symmetrical alternating-current signal, the harmonic (fs) of the drive frequency of the primary coil is only an odd-order harmonic. For example, a fifth-order harmonic (fs=5fd) may be used to detect the position of the secondary coil.

The calculation circuit calculates the center position of the secondary coil based on the coordinate position data when the harmonic resonance peak has been obtained, for example. Since the harmonic signal has a frequency that is not involved in normal power transmission from the primary coil to the secondary coil, the harmonic signal does not affect the normal operation. Moreover, since the resonance energy is reduced to about ⅕th of the basic frequency when using the fifth-order harmonic, the resonance peak value has an appropriate level so that the harmonic resonance peak can be easily detected by the harmonic detection circuit.

Since the center of the secondary coil can be accurately calculated utilizing the resonance peak, the primary coil and the secondary coil can be accurately positioned.

(3) In the power transmission control device, the primary coil and the secondary coil may be circular coils;

the actuator control circuit may drive the actuator to move the primary coil along a first axis that intersects the secondary coil to perform a first scan to detect the position of the secondary coil;

the calculation circuit may calculate the coordinates of a midpoint of a line segment that connects two points at which the peak of a detection signal of the harmonic detection circuit is obtained during the first scan;

the actuator control circuit may drive the actuator to move the primary coil along a second axis that perpendicularly intersects the first axis and passes through the midpoint calculated during the first scan to perform a second scan to detect the position of the secondary coil;

the calculation circuit may calculate the coordinates of the midpoint of the line segment that connects two points at which the peak of the detection signal of the harmonic detection circuit is obtained during the second scan; and the actuator control circuit may drive the actuator to move the primary coil so that the position of the center of the primary coil coincides with the position of the midpoint calculated during the second scan.

The power transmission control device according to this embodiment performs an orthogonal two-axis search utilizing the circular coil and harmonic detection.

The circular primary coil is scanned along an axis (first axis) in an arbitrary direction (first scan). For example, when the search range of the primary coil is rectangular, the primary coil necessarily intersects the secondary coil by moving the primary coil along a diagonal axis. The harmonic peak is obtained during the first scan when the center of the primary coil and the center of the secondary coil are positioned at a given distance (R). This positional relationship is implemented when the primary coil approaches the secondary coil and when the primary coil moves away from the secondary coil. Therefore, the harmonic resonance peak is obtained at two points in the XY plane by performing the first scan. The calculation circuit calculates the midpoint of a line segment that connects the two points.

The second scan is then performed. Specifically, the primary coil is moved along the second axis that passes through the midpoint of the line segment that connects the two points and perpendicularly intersects the first axis. The calculation circuit calculates the midpoint of a line segment that connects two points at which the harmonic peak is obtained by the second scan.

The coordinates of the midpoint thus calculated indicate the coordinates of the center of the secondary coil. Therefore, the primary coil is moved by the actuator so that the center of the circular primary coil coincides with the calculated center of the secondary coil. This enables the primary coil to be accurately positioned with respect to the secondary coil.

(4) The power transmission control device may further comprise:

a capacitor connected to the secondary coil, a capacitance of the capacitor may be set so that a resonant circuit that resonates with the harmonic of the drive frequency of the primary coil is formed by the capacitor and a leakage inductance when the center of the primary coil and the center of the secondary coil are positioned at a given distance, and the harmonic detection circuit may detect the resonance peak of the harmonic of the drive frequency of the primary coil due to the resonance of the resonant circuit.

According to this embodiment, the capacitance of the resonant capacitor of the secondary coil is set to resonate with a leakage inductance when the center of the primary coil and the center of the secondary coil are positioned at a given distance (R). Therefore, harmonic resonance occurs when the center of the primary coil and the center of the secondary coil are positioned at the given distance (R). The harmonic detection circuit provided in the primary-side instrument detects the harmonic resonance peak.

The term "leakage inductance" used herein refers to an apparent inductance inserted in series in each of the primary coil and the secondary coil when a magnetic flux that leaks (is not interlinked) from each of the primary coil and the secondary coil forms a closed circuit.

(5) The power transmission control device may further comprise:

an approach detection circuit that generates an approach detection signal based on a coil end voltage or a coil current of the primary coil, the approach detection signal indicating that the secondary coil has approached the primary coil, and the actuator control circuit may perform a scan for detecting the position of the secondary coil when an approach of the secondary coil has been detected based on the approach detection signal.

According to this embodiment, the approach of the primary coil is detected before positioning the primary coil utilizing the harmonic. A secondary coil is provided in an electronic instrument. Therefore, when the electronic instrument approaches a desk provided with a primary coil, for example, the secondary coil approaches the primary coil. When the approach of the secondary coil has been detected, the primary coil is automatically scanned for detecting the position of the secondary coil.

This enables a situation in which the secondary-side instrument has been placed (the secondary coil has approached the primary coil) to be automatically detected so that the primary coil can be automatically scanned utilizing the detected event as a trigger.

(6) In the power transmission control device, the secondary coil may be a secondary coil provided with a magnetic material; and when the inductance of the primary coil has increased due to the approach of the secondary coil provided with the magnetic material and the coil end voltage or the coil current when driving the primary coil at a given frequency has decreased so that the approach detection signal has reached a given threshold value, the actuator control circuit may perform the scanning to detect the position of the secondary coil.

This embodiment provides an example of a specific secondary coil approach detection method. For example, the secondary coil is a coil provided with a magnetic material. The magnetic material is a shield that separates a magnetic flux of the secondary coil from a secondary-side circuit, or may be a core of the secondary coil, for example.

When the secondary coil has approached the primary coil, a magnetic flux of the primary coil passes through the magnetic material of the secondary coil. As a result, the inductance of the primary coil increases. The term "inductance" used herein refers to an inductance (more accurately an apparent inductance) that changes due to the approach of the secondary coil provided with the magnetic material.

The term "apparent inductance" is distinguished from the inductance (self-inductance) of the primary coil (i.e., the inductance of the primary coil when the primary coil is not affected by the secondary coil). The value of the apparent inductance is obtained by measuring the inductance of the primary coil when the secondary coil has approached the primary coil using a measuring instrument, for example.

In this specification, the term "apparent inductance" is merely written as "inductance", except for the case where clear statement of the term "apparent inductance" is considered to be necessary. Since the coil end voltage (coil current) of the primary coil decreases along with an increase in the inductance of the primary coil, the approach of the primary coil can be detected by detecting the change in the coil end voltage (coil current).

(7) In the power transmission control device, the power-transmitting-side control circuit may intermittently drive the primary coil at the given frequency in order to detect the approach of the secondary coil.

According to this embodiment, the primary coil is intermittently (e.g., cyclically) driven in order to automatically detect the approach of the secondary coil. For example, a power transmission driver intermittently drives the primary coil at a given frequency, In this case, the approach of the secondary coil is detected when a decrease in the coil end voltage (coil current) has been detected.

(8) According to another embodiment of the invention, there is provided a power transmitting device comprising:

one of the above power transmission control devices; and a primary coil.

This implements a novel power transmitting device having a secondary coil position detection function and a primary coil positioning function.

(9) According to another embodiment of the invention, there is provided a power receiving device comprising:

a secondary coil; and a capacitor connected to the secondary coil, a capacitance of the capacitor being set so that a resonant circuit that resonates with a harmonic of a drive frequency of a primary coil is formed by the capacitor and a leakage inductance when a center of the primary coil and a center of the secondary coil are positioned at a given distance R ($R \geq 0$).

According to this embodiment, the capacitance of the power-reception-device-side capacitor (resonant capacitor connected to the secondary coil) is set to resonate with a leakage inductance when the center of the primary coil and the center of the secondary coil are positioned at the given distance (R).

In this embodiment, the given distance R is equal to or larger than zero ($R \geq 0$). In this embodiment, the given distance R may be zero (R=0). For example, when harmonic resonance has occurred when R=0 (i.e., when the center of the primary coil coincides with the center of the secondary coil), the primary coil and the secondary coil can be positioned by manually moving the primary-side instrument using the harmonic peak as an index, or removal (leave) of the secondary-side instrument can be detected depending on the presence or absence of the harmonic peak.

Note that the position of the secondary coil may be detected utilizing the above-mentioned orthogonal two-axis search while setting the given distance R to be larger than zero (R>0).

Since the power receiving device has such a configuration, harmonic resonance is implemented when the secondary coil has approached the primary coil and electromagnetically coupled to the primary coil, and the primary-side harmonic detection circuit can detect the harmonic resonance peak.

(10) In the power receiving device, the secondary coil may be a secondary coil provided with a magnetic material, and, when the distance between the center of the primary coil and the center of the secondary coil when a power transmitting device detects that the secondary coil provided with the magnetic material has approached the primary coil is referred to as L, the given distance R may satisfy the relationship $0 \leq R < L$.

According to this embodiment, the secondary coil is a coil provided with a magnetic material. This enables the power transmitting device to detect the approach of the secondary coil. When the distance between the primary coil and the secondary coil when the power transmitting device detects that the secondary coil has approached the primary coil is referred to as L, the distance L and the given distance R between the primary coil and the secondary coil when harmonic resonance occurs satisfy the relationship $0 \leq R < L$.

Specifically, the approach of the secondary coil is detected when the primary coil and the secondary coil have been positioned at the distance L. When the distance between the primary coil and the secondary coil has been reduced to R by scanning the primary coil, the harmonic resonance peak is detected.

Since the power receiving device has the configuration according to this embodiment, the power transmitting device can automatically detect the approach of the secondary coil and automatically detect the position of the secondary coil utilizing the resonance peak.

(11) According to another embodiment of the invention, there is provided a non-contact power transmission system comprising:

the above power transmitting device; and one of the above power receiving devices.

This implements a novel next-generation non-contact power transmission system having a secondary coil position detection function by calculations and a primary coil positioning function.

(12) According to another embodiment of the invention, there is provided an electronic instrument comprising one of the above power receiving devices.

The power receiving device has a function of implementing harmonic resonance (preferably together with a function of enabling approach detection). Therefore, when an electronic instrument including the power receiving device is merely placed on a flat surface in a chargeable area, the power transmitting device can detect the approach and the position of the electronic instrument automatically position the primary coil, and transmit power to the power receiving device.

The electronic instrument is an electronic instrument (e.g., portable terminal) including the power receiving device. The electronic instrument may be an adaptor (holder) that includes the power receiving device and is externally attached to a portable terminal.

(13) According to another embodiment of the invention, there is provided a secondary coil position detection method for a non-contact power transmission system that transmits power from a power transmitting device to a power receiving device via non-contact power transmission through a circular primary coil and a circular secondary coil that are electromagnetically coupled, a capacitor being connected to the secondary coil, and a resonant circuit that resonates with a harmonic of a drive frequency of the primary coil being formed by the capacitor and a leakage inductance when the primary coil and the secondary coil are electromagnetically coupled in a state in which a center of the primary coil and a center of the secondary coil are positioned at a given distance, the method comprising:

moving the primary coil along a first axis that intersects the secondary coil to perform a first scan to detect the position of the secondary coil;

calculating coordinates of a midpoint of a line segment that connects two points at which the peak of a detection signal of a harmonic detection circuit is obtained during the first scan;

moving the primary coil along a second axis that perpendicularly intersects the first axis and passes through the midpoint calculated during the first scan to perform a second scan to detect the position of the secondary coil; and calculating coordinates of a midpoint of a line segment that connects two points at which the peak of the detection signal of the harmonic detection circuit is obtained during the second scan to detect the position of the secondary coil.

The secondary coil position detection method according to this embodiment accurately detects the position of the secondary coil (i.e., the position of the center of the secondary coil) using the above-mentioned orthogonal two-axis search.

(14) According to another embodiment of the invention, there is provided a primary coil positioning method comprising:

moving a primary coil to the position of a secondary coil detected by the above secondary coil position detection method to position the primary coil to a position of the secondary coil.

The primary coil positioning method according to this embodiment can move the primary coil to the calculated position of the secondary coil to accurately position the primary coil.

(15) The primary coil positioning method may further comprise:

intermittently driving the primary coil at a given frequency in order to detect an approach of the secondary coil provided with a magnetic material before performing the secondary coil position detection method, the primary coil positioning method may be performed on condition that an inductance of the primary coil has increased due to the approach of the secondary coil provided with the magnetic material and a coil end voltage or a coil current when driving the primary coil at the given frequency has decreased so that an approach detection signal generated based on the coil end voltage or the coil current has reached a given threshold value.

In the primary coil positioning method according to this embodiment, the approach of the primary coil is automatically detected, and the primary coil is automatically positioned when the approach has been detected.

Therefore, the user can charge the battery, for example, by merely placing an electronic instrument including the power receiving device in a specific area on a desk provided with the power receiving device. Therefore, convenient non-contact power transmission that reduces the user's workload is implemented.

Preferred embodiments of the invention are described below with reference to the drawings. Note that the following embodiments do not in any way limit the scope of the invention defined by the claims laid out herein. Note that all elements of the following embodiments should not necessarily be taken as essential requirements for the invention.

First Embodiment

An application example of a non-contact power transmission system utilizing the invention is given below.

Application example of non-contact power transmission system

Figure 1B:
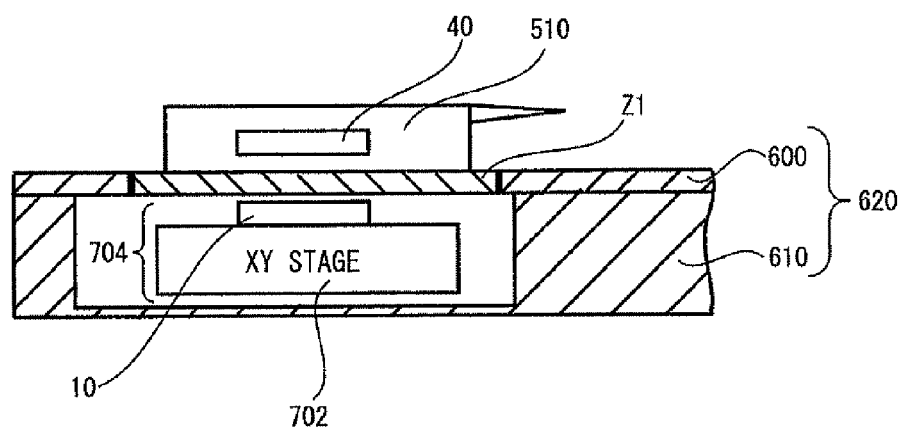

FIGS. 1A and 1B are views showing an example of an application of a non-contact power transmission system utilizing the invention. FIG. 1A is a perspective view showing a system desk, and FIG. 1B is a cross-sectional view of the system desk shown in FIG. 1A along the line P-P'.

As shown in FIG. 1B, a power-transmitting-side device (i.e., a primary-side structure including a power transmitting device 10 according to the invention, an actuator (not shown), and an XY stage 702) 704 is provided in a structure (system desk in this example) 620 having a flat surface.

Specifically, the power-transmitting-side device 704 is placed in a depression formed in the system desk 620. A flat plate (flat member; e.g., an acrylic plate having a thickness of several millimeters) 600 is provided over (on the upper side of) the system desk 620. The flat plate 600 is supported by a support member 610.

The flat plate 600 includes a portable terminal placement area Z1 in which a portable terminal (such as a portable telephone terminal, a PDA terminal, and a portable computer terminal) is placed.

As shown in FIG. 1A, the portable terminal placement area Z1 included in the flat plate 600 differs in color from the remaining area so that the user can determine that the portable terminal placement area Z1 is an area in which a portable terminal should be placed. Note that the color of the boundary area between the portable terminal placement area Z1 and the remaining area may be changed instead of changing the color of the entire portable terminal placement area Z1.

A portable terminal (secondary-side instrument) 510 includes a power receiving device 40 (including a secondary coil) that receives power transmitted from the power transmitting device 10.

When the portable terminal 510 has been placed at an approximate position in the portable terminal placement area Z1, the power transmitting device 10 provided in the system desk 620 automatically detects that the portable terminal 510 has been placed in the portable terminal placement area Z1, and moves the XY stage (movable stage) by driving the actuator (not shown in FIG. 1) to automatically adjust the position of the primary coil corresponding to the position of the secondary coil. The above-described primary coil position automatic adjustment function enables non-contact power transmission to be performed while optimizing the positional relationship between the primary coil and the secondary coil regardless of the manufacturer, type, size, shape, design, and the like of the portable terminal.

Configuration and operation of non-contact power transmission system

Figure 2:
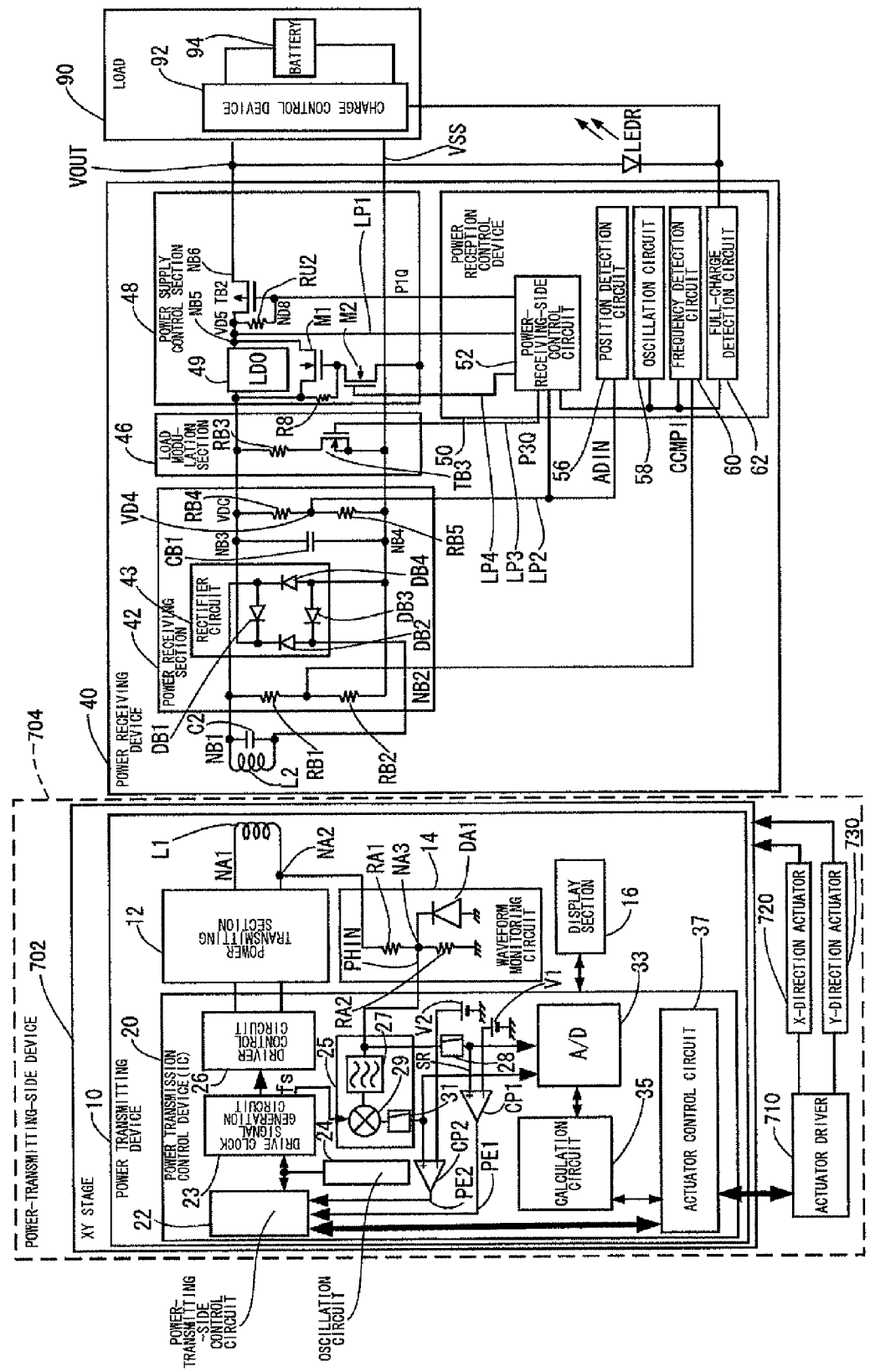
FIG. 2 is a circuit diagram showing an example of a specific configuration of each section of a non-contact power transmission system that includes a power transmitting device and a power receiving device.

FIG. 2 is a circuit diagram showing an example of a specific configuration of each section of a non-contact power transmission system that includes a power transmitting device and a power receiving device.

Configuration and Operation of Power Transmitting Device

As shown in FIG. 2 (left), the power-transmitting-side device (primary-side structure) 704 includes the XY stage (movable stage) 702, the power transmitting device 10 that can be moved by the XY stage 702 in an X-axis direction and a Y-axis direction, an actuator driver 710, an X-direction actuator 720, and a Y-direction actuator 730. Specifically, the power transmitting device 10 is placed on a top plate (movable plate) of the XY stage 702 (described later with reference to FIG. 14).

The power transmitting device 10 includes a power transmission control device 20, a power transmitting section 12, a waveform monitoring circuit 14, and a display section 16. The power transmission control device 20 includes a power-transmitting-side control circuit 22, a drive clock signal generation circuit 23, an oscillation circuit 24, a harmonic detection circuit 25 (including a filter circuit 27, a mixer 29 that adds a harmonic fs, and a detection circuit 31), a driver control circuit 26, a waveform detection circuit (peak-hold circuit or pulse width detection circuit) 28, comparators (CP1 and CP2), an A/D converter 33, a calculation circuit 35, and an actuator control circuit 37.

The power receiving device 40 includes a power receiving section 42, a load modulation section 46, and a power supply control section 48. The power receiving section 42 includes a rectifier circuit 43, a load modulation section 46, a power supply control section 48, and a control section 50. An actual load 90 includes a charge control device 92 and a battery (secondary battery) 94.

The configuration shown in FIG. 2 implements a non-contact power transmission (contactless power transmission) system that electromagnetically couples the primary coil L1 and the secondary coil L2 to transmit power from the power transmitting device 10 to the power receiving device 40 and supply power (voltage VOUT) to the load 90 from a voltage output node NB6 of the power receiving device 40.

The power transmitting section 12 generates an alternating-current voltage having a given frequency during power transmission, and generates an alternating-current voltage having a frequency that differs depending on data during data transfer. The power transmitting section 12 supplies the generated alternating-current voltage to the primary coil L1.

Figure 3A:
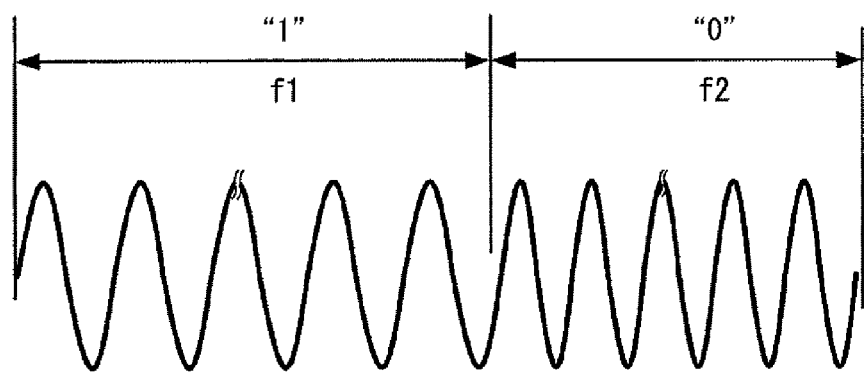
FIGS. 3A and 3B are views illustrative of the principle of information transmission between a primary-side instrument and a secondary-side instrument.
Figure 3B:
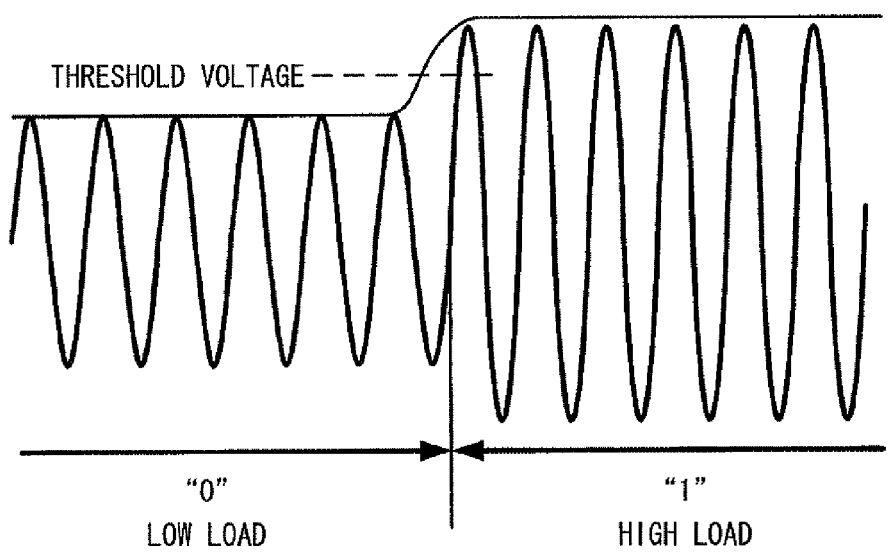

FIGS. 3A and 3B are views illustrative of the principle of information transmission between a primary-side instrument and a secondary-side instrument information is transmitted from the primary-side instrument to the secondary-side instrument utilizing frequency modulation. Information is transmitted from the secondary-side instrument to the primary-side instrument utilizing load modulation.

As shown in the FIG. 3A, the power transmitting device 10 generates an alternating-current voltage having a frequency f1 when transmitting data "1" to the power receiving device 40, and generates an alternating-current voltage having a frequency f2 when transmitting data "0" to the power receiving device 40, for example.

As shown in FIG. 3B, the power receiving device 40 can switch the load state between a low-load state and a high-load state by load modulation to transmit data "0" or "1" to the primary-side instrument (power transmitting device 10).

The power transmitting section 12 shown in FIG. 2 may include a first power transmitting driver that drives one end of the primary coil L1, a second power transmitting driver that drives the other end of the primary coil L1, and at least one capacitor that forms a resonant circuit with the primary coil L1. Each of the first and second power transmitting drivers included in the power transmitting section 12 is an inverter circuit (or buffer circuit) that includes a power MOS transistor, for example, and is controlled by the driver control circuit 26 of the power transmission control device 20.

The primary coil L1 (power-transmitting-side coil) is electromagnetically coupled to the secondary coil L2 (power-receiving-side coil) to form a power transmission transformer. For example, when power transmission is necessary, the portable telephone 510 is placed on the flat plate 600 so that a magnetic flux of the primary coil L1 passes through the secondary coil L2, as shown in FIG. 1. When power transmission is unnecessary, the portable telephone 510 is physically separated from the flat plate 600 so that a magnetic flux of the primary coil L1 does not pass through the secondary coil L2.

As the primary coil L1 and the secondary coil L2, a planar coil formed by spirally winding an insulated wire in a single plane may be used, for example. Note that a planar coil formed by spirally winding a twisted wire (i.e., a wire obtained by twisting a plurality of insulated thin wires) may also be used. The type of coil is not particularly limited. When performing an orthogonal two-axis search described later, a circular (radius: R) planar coil is used, for example.

The waveform monitoring circuit 14 is a circuit that detects an induced voltage in the primary coil L1. The waveform monitoring circuit 14 may include resistors RA1 and RA2, and a diode DA1 provided between a common connection point NA3 of the resistors RA1 and RA2 and a power supply GND (low-potential-side power supply in a broad sense), for example. Specifically, a signal PHIN obtained by dividing the induced voltage in the primary coil L1 using the resistors RA1 and RA2 is input to the waveform detection circuit 28 of the power transmission control device 20.

The display section 16 displays the state (e.g., power transmission or ID authentication) of the non-contact power transmission system using a color, an image, or the like. The display section 16 is implemented by a light-emitting diode (LED), a liquid crystal display (LCD), or the like.

The power transmission control device 20 controls the power transmitting device 10. The power transmission control device 20 may be implemented by an integrated circuit device (IC) or the like. The power transmission control device 20 includes the power-transmitting-side control circuit 22, the drive clock signal generation circuit 23, the oscillation circuit 24, the harmonic detection circuit 25, the driver control circuit 26, the waveform detection circuit (peak-hold circuit or pulse width detection circuit) 28, the comparators CP1 and CP2, the A/D converter 33, the calculation circuit 35, and the actuator control circuit 37.

The power-transmitting-side control circuit 22 controls the power transmitting device 10 and the power transmission control device 20. The power-transmitting-side control circuit 22 may be implemented by a gate array, a microcomputer, or the like. Specifically, the power-transmitting-side control circuit 22 performs sequence control and a determination process necessary for power transmission, load detection, frequency modulation, foreign object detection, removal (detachment) detection, and the like.

The oscillation circuit 24 includes a crystal oscillation circuit or the like, and generates a primary-side clock signal. The drive clock signal generation circuit 23 generates a drive control signal having a desired frequency based on a clock signal generated by the oscillation circuit 24 and a frequency setting signal supplied from the power-transmitting-side control circuit 22.

The driver control circuit 26 outputs the drive control signal to the power transmitting drivers (not shown) of the power transmitting section 12 while preventing a situation in which the power transmitting drivers (not shown) are turned ON simultaneously to control the operations of the power transmitting driver, for example.

The waveform detection circuit 28 monitors the waveform of the signal PHIN that corresponds to an induced voltage at one end of the primary coil L1, and performs load detection, foreign object detection, and the like. For example, when the load modulation section 46 of the power receiving device 40 has performed load modulation for transmitting data to the power transmitting device 10, the signal waveform of the induced voltage in the primary coil L1 changes correspondingly.

As shown in FIG. 3B, the amplitude (peak voltage) of the signal waveform decreases when the load modulation section 46 of the power receiving device 40 reduces the load in order to transmit data "0", and increases when the load modulation section 46 increases the load in order to transmit data "1". Therefore, the waveform detection circuit 28 can determine whether the data transmitted from the power receiving device 40 is "0" or "1" by determining whether or not the peak voltage has exceeded a threshold voltage by performing a peak-hold process on the signal waveform of the induced voltage, for example.

Note that the waveform detection method is not limited to the above-described method. For example, the waveform detection circuit 28 may determine whether the power-receiving-side load has increased or decreased utilizing a physical quantity other than the peak voltage. For example, whether the power-receiving-side load has increased or decreased may be determined utilizing the peak current.

As the waveform detection circuit 28, a peak-hold circuit (or a pulse width detection circuit that detects the pulse width determined by the phase difference between a voltage and a current) may be used. A relative position signal PE that indicates the relative positional relationship between the primary coil L1 and the secondary coil L2 is obtained by comparing the level of a signal output from the waveform detection circuit 28 with a given threshold value using a comparator.

Configuration and Operation of Power Receiving Device

The power receiving device 40 (power receiving module or secondary module) may include the secondary coil L2 (including a resonant capacitor C2 connected to each end, and preferably including a magnetic material FS), the power receiving section 42, the load modulation section 46, the power supply control section 48, and a power reception control device 50. Note that the power receiving device 40 and the power reception control device 50 are not limited to the configuration shown in FIG. 2. Various modifications may be made such as omitting some of the elements, adding other elements, or changing the connection relationship.

The power receiving section 42 converts an alternating-current induced voltage in the secondary coil L2 into a direct-current voltage. A rectifier circuit 43 included in the power receiving section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC generation node). The diode DB2 is provided between the node NB3 and a node NB2 at the other end of the secondary coil L2. The diode DB3 is provided between the node NB2 and a node NB4 (VSS). The diode DB4 is provided between the nodes NB4 and NB1.

Resistors RB1 and RB2 of the power receiving section 42 are provided between the nodes NB1 and NB4. A signal CCMPI obtained by dividing the voltage between the nodes NB1 and NB4 using the resistors RB1 and R1B2 is input to a frequency detection circuit 60 of the power reception control device 50.

A capacitor CB1 and resistors RB4 and 1B5 of the power receiving section 42 are provided between the node NB3 (direct-current voltage VDC) and the node NB4 (VSS). A divided voltage D4 obtained by dividing the voltage between the nodes NB3 and NB4 using the resistors RB4 and RB5 is input to a power-receiving-side control circuit 52 and a position detection circuit 56 through a signal line LP2. The divided voltage VD4 is input to the position detection circuit 56 as a position detection signal input (ADIN).

The load modulation section 46 performs a load modulation process. Specifically, when the power receiving device 40 transmits desired data to the power transmitting device 10, the load modulation section 46 variably changes the load of the load modulation section 46 (secondary side) depending on the transmission target data to change the signal waveform of the induced voltage in the primary coil L1. The load modulation section 46 includes a resistor RB3 and a transistor TB3 (N-type CMOS transistor) provided in series between the nodes NB3 and NB4.

The transistor TB3 is ON/OFF-controlled based on a control signal P3Q supplied from the power-receiving-side control circuit 52 of the power reception control device 50 through a signal line LP3. When performing the load modulation process by ON/OFF-controlling the transistor TB3 and transmitting a signal to the power transmitting device in an authentication stage before main power transmission starts, a transistor TB2 of the power supply control section 48 is turned OFF so that the load 90 is not electrically connected to the power receiving device 40.

For example, when reducing the secondary-side load (high impedance) in order to transmit data "0", the signal P3Q is set at the L level so that the transistor TB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 is equivalent to the resistor RB3 (high load).

The power supply control section 48 controls power supply to the load 90. A regulator (LDO) 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

A switch circuit formed using a PMOS transistor (M1) is provided between the input terminal and the output terminal of the regulator (LDO) 49. A path that bypasses the regulator (LDO) 49 is formed by causing the PMOS transistor (M1) (switch circuit) to be turned ON.

For example, since a power loss increases due to the equivalent impedance of the regulator 49 and heat generation increases under heavy load (e.g., when it is necessary to cause an almost constant large current to steadily flow in the initial stage of charging a secondary battery exhausted to a large extent), a current is supplied to the load through a path that bypasses the regulator.

An NMOS transistor (M2) and a pull-up resistor R8 that function as a bypass control circuit are provided to ON/OFF-control the PMOS transistor (M1) (switch circuit).

The NMOS transistor (M2) is turned ON when a high-level control signal is supplied to the gate of the NMOS transistor (M2) through a signal line LP4. This causes the gate of the PMOS transistor (M1) to be set at a low level so that the PMOS transistor (M1) is turned ON, whereby a path that bypasses the regulator (LDO) 49 is formed. When the NMOS transistor (M2) is turned OFF, the gate of the PMOS transistor (M1) is maintained at a high level through the pull-up resistor R8. Therefore, the PMOS transistor (M1) is turned OFF so that the bypass path is not formed.

The NMOS transistor (M2) is ON/OFF-controlled by the power-receiving-side control circuit 52 included in the power reception control device 50.

The transistor TB2 (P-type CMOS transistor) is provided between a power supply voltage (VD5) generation node NB5 (output node of the regulator 49) and the node NB6 (voltage output node of the power receiving device 40), and is controlled based on a signal P1Q output from the power-receiving-side control circuit 52 of the power reception control device 50. Specifically, the transistor TB2 is turned ON when main power transmission is performed after completion (establishment) of ID authentication.

The power reception control device 50 controls the power receiving device 40. The power reception control device 50 may be implemented by an integrated circuit device (IC) or the like. The power reception control device 50 may operate based on the power supply voltage VD5 generated based on the induced voltage in the secondary coil L2. The power reception control device 50 may include the (power-receiving-side) control circuit 52, the position detection circuit 56, an oscillation circuit 58, the frequency detection circuit 60, and a full-charge detection circuit 62.

The power-receiving-side control circuit 52 controls the power receiving device 40 and the power reception control device 50. The power-receiving-side control circuit 52 may be implemented by a gate array, a microcomputer, or the like. The power-receiving-side control circuit 52 operates based on a constant voltage (VD5) at the output terminal of the series regulator (LDO) 49 as a power supply voltage. The power supply voltage (VD5) is supplied to the power-receiving-side control circuit 52 through a power supply line LP1.

The power-receiving-side control circuit 52 performs sequence control and a determination process necessary for ID authentication, position detection, frequency detection, full-charge detection, load modulation for authentication communication, load modulation for communication that enables detection of foreign object insertion, and the like.

The position detection circuit 56 monitors the waveform of the signal ADIN that corresponds to the waveform of the induced voltage in the secondary coil L2, and determines whether or not the positional relationship between the primary coil L1 and the secondary coil L2 is appropriate.

Specifically, the position detection circuit 56 converts the signal ADIN into a binary value using a comparator, and determines whether or not the positional relationship between the primary coil L1 and the secondary coil L2 is appropriate.

The oscillation circuit 58 includes a CR oscillation circuit or the like, and generates a secondary-side clock signal. The frequency detection circuit 60 detects the frequency (f1 or f2) of the signal CCMPI, and determines whether the data transmitted from the power transmitting device 10 is "1" or "0".

The full-charge detection circuit 62 (charge detection circuit) detects whether or not the battery 94 of the load 90 has been fully charged (charge state). Specifically, the full-charge detection circuit 62 detects the full-charge state by detecting whether a light-emitting device (LEDR) used to indicate the charge state is turned ON or OFF, for example. The full-charge detection circuit 62 determines that the battery 94 has been fully charged (charging has been completed) when the light-emitting device (LEDR) has been turned OFF for a given period of time (e.g., five seconds).

The charge control device 92 of the load 90 can also detect the full-charge state based on the ON/OFF state of the light-emitting device (LEDR).

The load 90 includes the charge control device 92 that controls charging of the battery 94 and the like. The charge control device 92 detects the full-charge state based on the ON/OFF state of the light-emitting device (LEDR). The charge control device 92 (charge control IC) may be implemented by an integrated circuit device or the like.

The battery 94 may be provided with the function of the charge control device 92 (e.g., smart battery). Note that the actual load 90 is not limited to a secondary battery. For example, a given circuit may serve as an actual load when the circuit operates.

Secondary-side instrument approach detection and coil positioning

Figure 4:
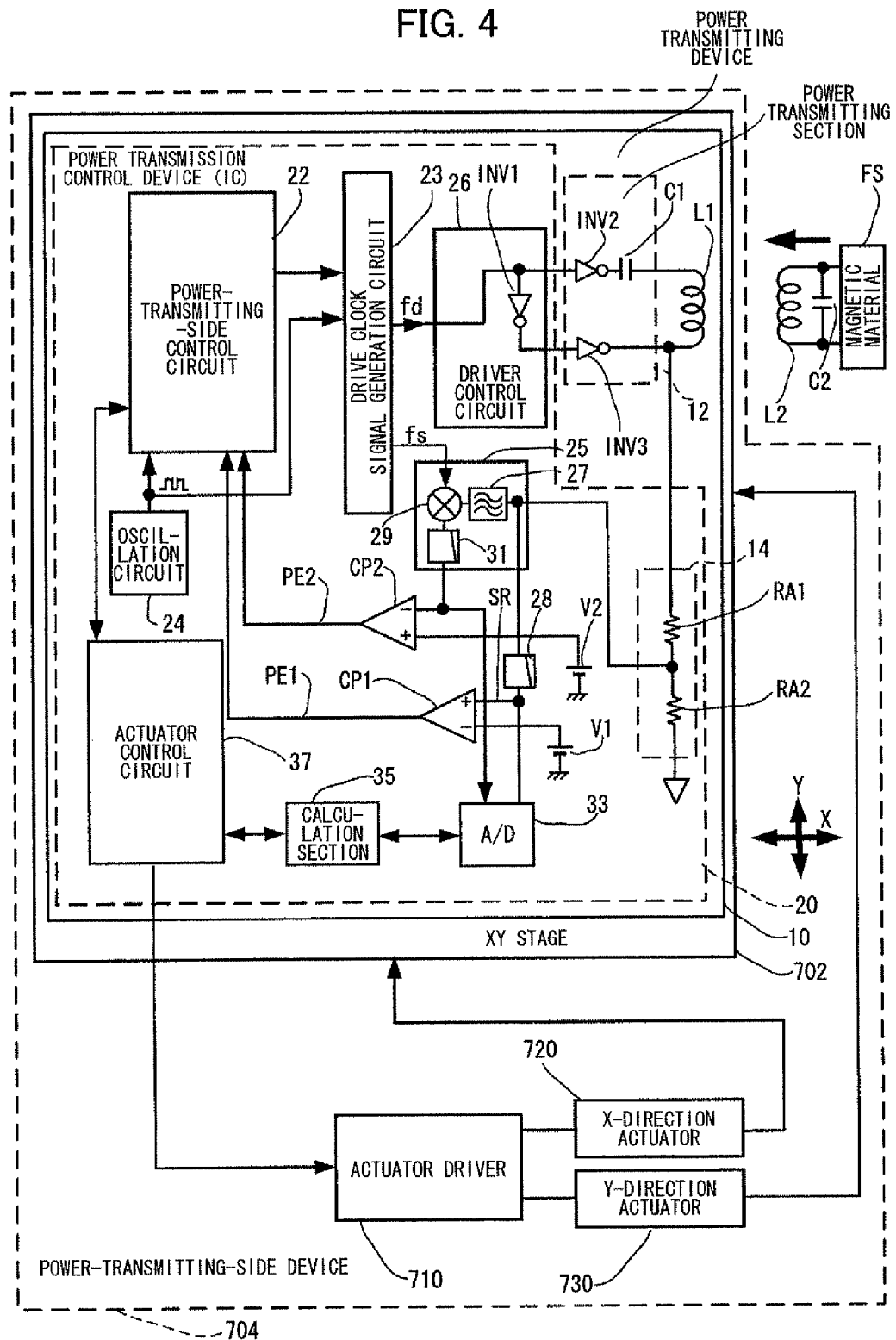
FIG. 4 is a view showing a primary-side configuration for secondary-side instrument approach detection and automatic coil positioning.

FIG. 4 is a view showing the primary-side configuration for secondary-side instrument approach detection and automatic coil positioning. FIG. 4 shows the internal configuration of the power transmitting device 10 shown in the FIG. 2 in detail.

In FIG. 4, the waveform detection circuit 28 is a peak-hold circuit. The waveform detection circuit 28 outputs a peak voltage SR of the coil end voltage. The peak voltage SR may be utilized for detecting the approach of the secondary coil L2. The peak voltage SR is compared with a first threshold value (approach detection threshold value) V1 by the comparator CP1. An output signal PE1 from the comparator CP1 is supplied to the power-transmitting-side control circuit 22.

The harmonic detection circuit 25 includes the filter circuit 27 that filters a voltage signal from the waveform monitoring circuit 14, the mixer 29 that adds an odd-order harmonic (fifth-order harmonic in this example) fs of the primary coil L1, and the detection circuit 31.

When the resonance frequency of the primary-side series resonant circuit formed by the primary coil L1 and the capacitor C1 is referred to as fp, the drive frequency of the primary coil is generally set at a frequency (fd) away from the resonance frequency (fp) taking operational stability into consideration. When the drive signal is a symmetrical alternating-current signal, the harmonic (fs) of the drive frequency of the primary coil contains only an odd-order harmonic. A fifth-order harmonic (fs=5fd) may be used to detect the position of the secondary coil, for example.

The detection output from the harmonic detection circuit 25 is compared with a second threshold value (harmonic resonance peak detection threshold value) V2 by the comparator CP2. An output signal PE2 from the comparator CP2 is supplied to the power-transmitting-side control circuit 22 and the A/D converter 33, and is converted into a digital signal. The digital data obtained by A/D conversion is supplied to the calculation circuit 35.

The calculation circuit 35 has XY plane coordinate information stored in a RAM (not shown). The calculation circuit 35 can specify the coordinate position in the XY plane corresponding to the timing at which the harmonic peak is obtained based on the moving direction and the moving velocity when the primary coil (L1) is scanned by the actuator control circuit 37 and the timing at which the harmonic peak is obtained, and calculate the coordinates of the midpoint of a line segment that connects the specified two points. The center position of the secondary coil (L2) can thus be calculated based on the coordinate position data when the harmonic peak is obtained (described later in detail).

The power-transmitting-side control circuit 22 detects the approach of the secondary-side instrument (secondary coil L2) based on the output signal (PE1) from the comparator CP1. The power-transmitting-side control circuit 22 transmits a primary coil (primary-side instrument) scan instruction to the actuator control circuit 37 using the output signal (PE2) from the comparator CP2 as an index. The actuator control circuit 37 drives the actuator in response to the scan instruction from the power-transmitting-side control circuit 22.

Note that the output signal (PE2) from the comparator CP2 may be input to the actuator control circuit 37 so that the actuator is driven based on a determination by the actuator.

As shown in FIG. 4 (upper right), the secondary coil (L2) is provided with the harmonic resonant capacitor C2 and the magnetic material FS. The magnetic material FS is a shield that separates a magnetic flux from a circuit, or may be a core of the secondary coil, for example. The primary-side instrument can detect the approach of the secondary coil due to the presence of the magnetic material FS (described later in detail).

Secondary Coil Approach Detection Principle

The secondary coil approach detection principle is described below with reference to FIGS. 5 to 7. FIGS. 5A to 5F are views illustrative of an increase in inductance that occurs when a magnetic material attached to the secondary coil has approached the primary coil.

The term "inductance" used herein refers to an inductance (more accurately an apparent inductance) that changes due to the approach of the secondary coil provided with a magnetic material, as described above. The term "apparent inductance" is distinguished from the inductance (self-inductance) of the primary coil (i.e., the inductance of the primary coil when the primary coil is not affected by the secondary coil). In the following description, the apparent inductance is indicated by Lps.

Figure 5A:
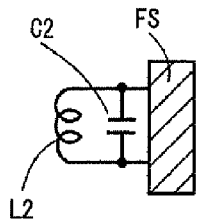
FIGS. 5A to 5F are views illustrative of an increase in inductance that occurs when a magnetic material attached to a secondary coil has approached a primary coil.
Figure 5B:
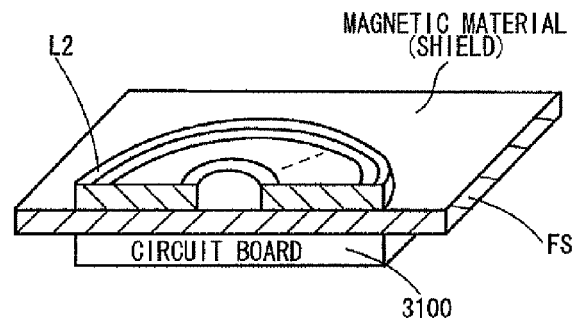

As shown in FIG. 5A, the magnetic material (FS) is attached to the secondary coil L2. As shown in FIG. 5B, the magnetic material (FS) is a magnetic material used as a magnetic shielding material provided between the secondary coil L2 (i.e., planar coil) and a circuit board 3100, for example. Note that the magnetic material (FS) is not limited thereto, but may be a magnetic material used as a core of the secondary coil L2.

Figure 5C:
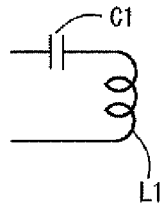
Figure 5D:
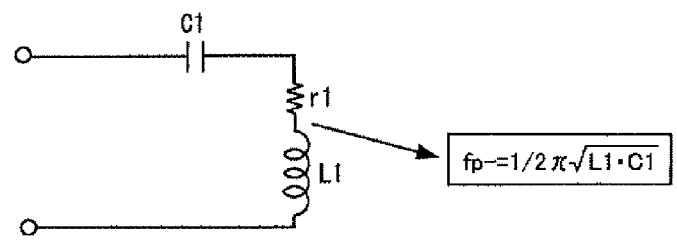
Figure 5F:
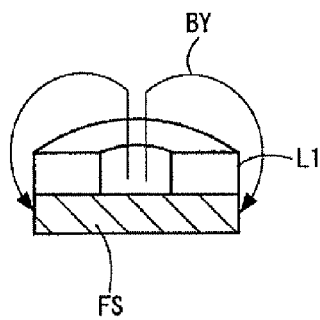
Figure 5E:
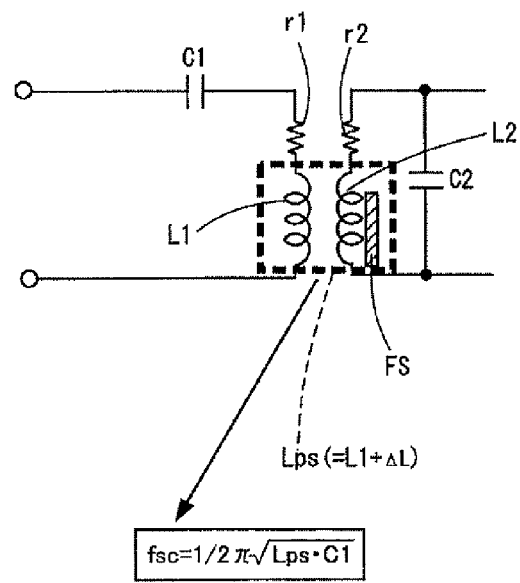

FIG. 5D shows an equivalent circuit of the primary coil L1 shown in FIG. 5C. The resonance frequency of the primary coil L1 is fp. Specifically, the resonance frequency is determined by the primary coil L1 and the capacitor C1. As shown in FIG. 5E, when the secondary coil L2 has approached the primary coil L1, the magnetic material (FS) attached to the secondary coil L1 is coupled to the primary coil L1. Therefore, the magnetic flux of the primary coil (L1) passes through the magnetic material (FS) (see FIG. 5F) so that the magnetic flux density increases.

As a result, the inductance of the primary coil L1 increases. In this case, the resonance frequency of the primary coil L1 is fsc, as shown in FIG. 5E. Specifically, the resonance frequency is determined by the apparent inductance Lps (i.e., the apparent inductance of the primary coil for which the approach of the secondary coil is taken into consideration) and the primary-side resonant capacitor C1.

The apparent inductance Lps of the primary coil is expressed by Lps=L1+ΔL (where, L1 is the inductance (self-inductance) of the primary coil, and ΔL is an increase in inductance due to the approach of the magnetic material FS to the primary coil). A specific value of the apparent inductance Lps may be acquired by measuring the inductance of the primary coil when the secondary coil has approached the primary coil using a measuring instrument, for example.

A change in the inductance of the primary coil due to the approach of the secondary coil is discussed below.

FIGS. 6A to 6D are views showing examples of the relative positional relationship between the primary coil and the secondary coil. In FIGS. 6A to 6D, PA1 indicates the center of the primary coil L1, and PA2 indicates the center of the secondary coil L2.

Figure 6A:
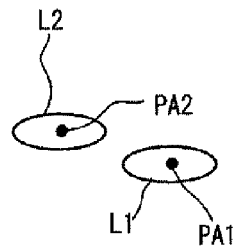
FIGS. 6A to 6D are views showing examples of the relative positional relationship between a primary coil and a secondary coil.
Figure 6B:
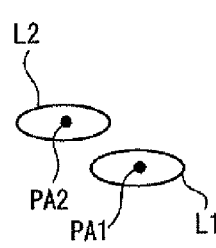

In FIG. 6A, since the secondary coil L2 is positioned away from the primary coil L1, the primary coil L1 is not affected by the secondary coil L2. When the secondary coil (L2) has approached the primary coil (L1), as shown in FIG. 6B, the inductance of the primary coil L1 increases, as described with reference to FIGS. 5E and 5F.

Figure 6C:
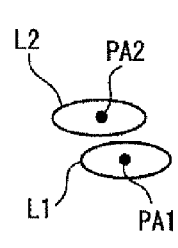
Figure 6D:
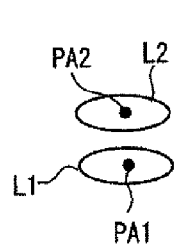

In FIG. 6C, the primary coil L1 and the secondary coil L2 are coupled so that mutual induction (i.e., a phenomenon in which the magnetic flux of one coil is canceled by the magnetic flux of the other coil) occurs in addition to self-induction. When the position of the secondary coil L2 has coincided with the position of the primary coil L1, as shown in FIG. 6D, a current flows through the secondary coil (L2) so that a leakage magnetic flux decreases due to cancellation of the magnetic flux as a result of mutual induction, whereby the inductance of the coil decreases.

Specifically, the secondary-side instrument starts to operate as a result of positioning. A current flows through the secondary coil (L2) due to the operation of the secondary-side instrument so that a leakage magnetic flux decreases due to cancellation of the magnetic flux as a result of mutual induction, whereby the inductance of the primary coil (L1) decreases.

Figure 7:
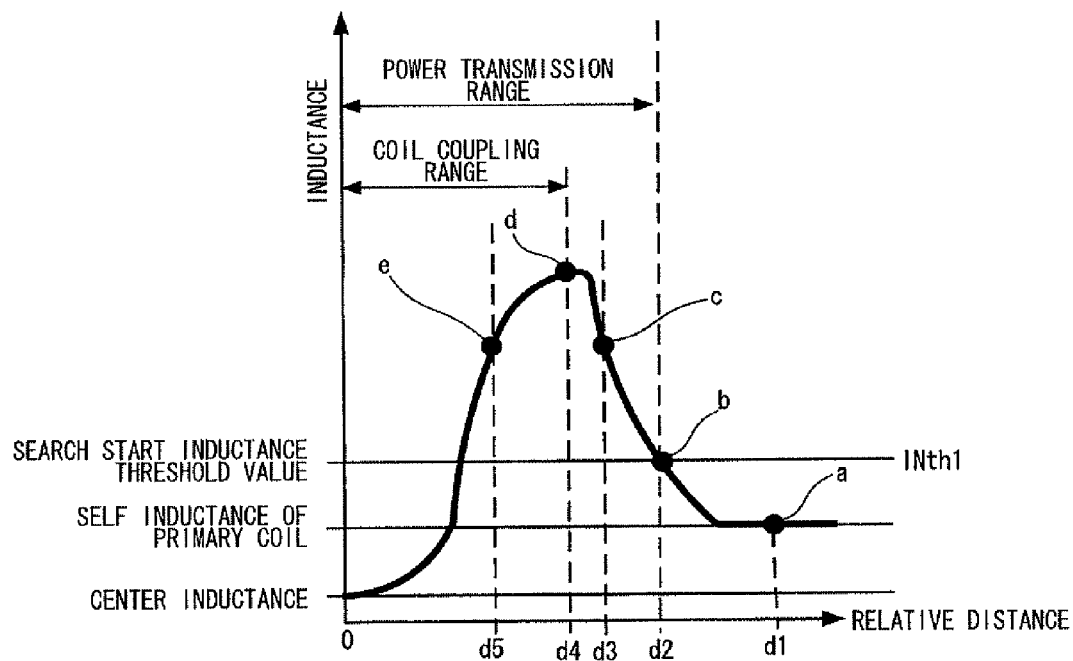
FIG. 7 is a view showing the relationship between the relative distance between a primary coil and a secondary coil and the inductance of the primary coil.

FIG. 7 is a view showing the relationship between the relative distance between the primary coil and the secondary coil and the inductance of the primary coil. In FIG. 7, the horizontal axis indicates the relative distance, and the vertical axis indicates the inductance. The term "relative distance" used herein refers to a relative value obtained by normalizing the distance between the centers of the two coils in the horizontal direction. The relative distance is an index that indicates the distance between the coils in the horizontal direction. An absolute distance (e.g., an absolute value (mm) that indicates the distance between the centers of the coils in the horizontal direction) may be used instead of the relative distance.

In FIG. 7, when the relative distance is d1, the primary coil L1 is not affected by the secondary coil. In this case, the inductance of the primary coil L1 is "a" (i.e., the self-inductance of the primary coil). When the secondary coil L2 has approached the primary coil L1 (relative distance: d2), the magnetic flux density increases due to the magnetic material so that the inductance of the primary coil L1 increases to "b".

When the secondary coil L2 has further approached the primary coil L1 (relative distance: d3), the inductance of the primary coil L1 increases to "c". When the secondary coil L2 has further approached the primary coil L1 (relative distance: d4), the inductance of the primary coil L1 increases to "d". The primary coil L1 and the secondary coil L2 are coupled in this state so that the effect of mutual inductance becomes predominant.

Specifically, when the relative distance is d5, since the effect of mutual inductance becomes predominant, the inductance of the primary coil L1 then decreases to "e". When the relative distance is 0 (i.e., the centers of the primary coil and the secondary coil are positioned at the center of the XY plane), a leakage magnetic flux is minimized due to cancellation of the magnetic flux so that the inductance of the primary coil L1 converges to a constant value ("center inductance" in FIG. 7).

The relative distance d2 is the power transmission limit range. In this case, it is possible to detect that the secondary coil (L2) has approached the primary coil L1 up to the relative distance d2 using an inductance threshold value (INth1). Specifically, when an increase in inductance due to the approach of the secondary coil (L2) has been detected using the first inductance threshold value (INth1), the secondary coil L2 has approached the primary coil L1 to such an extent that the relative distance is almost within the power transmission range.

Note that the approach of the secondary coil is actually determined using a voltage threshold value (first threshold value V1) corresponding to the inductance threshold value (INth1).

In this embodiment, the power transmitting section 12 intermittently (e.g., cyclically) drives the primary coil (L1) in order to automatically detect the approach of the secondary coil (L2). This enables automatic detection of the approach of the secondary coil (secondary-side instrument).

When the approach of the secondary coil (L2) has been detected, a secondary coil position detection operation utilizing harmonic resonance is performed. The details are described below.

Secondary coil position detection principle utilizing harmonic resonance

Figure 8:
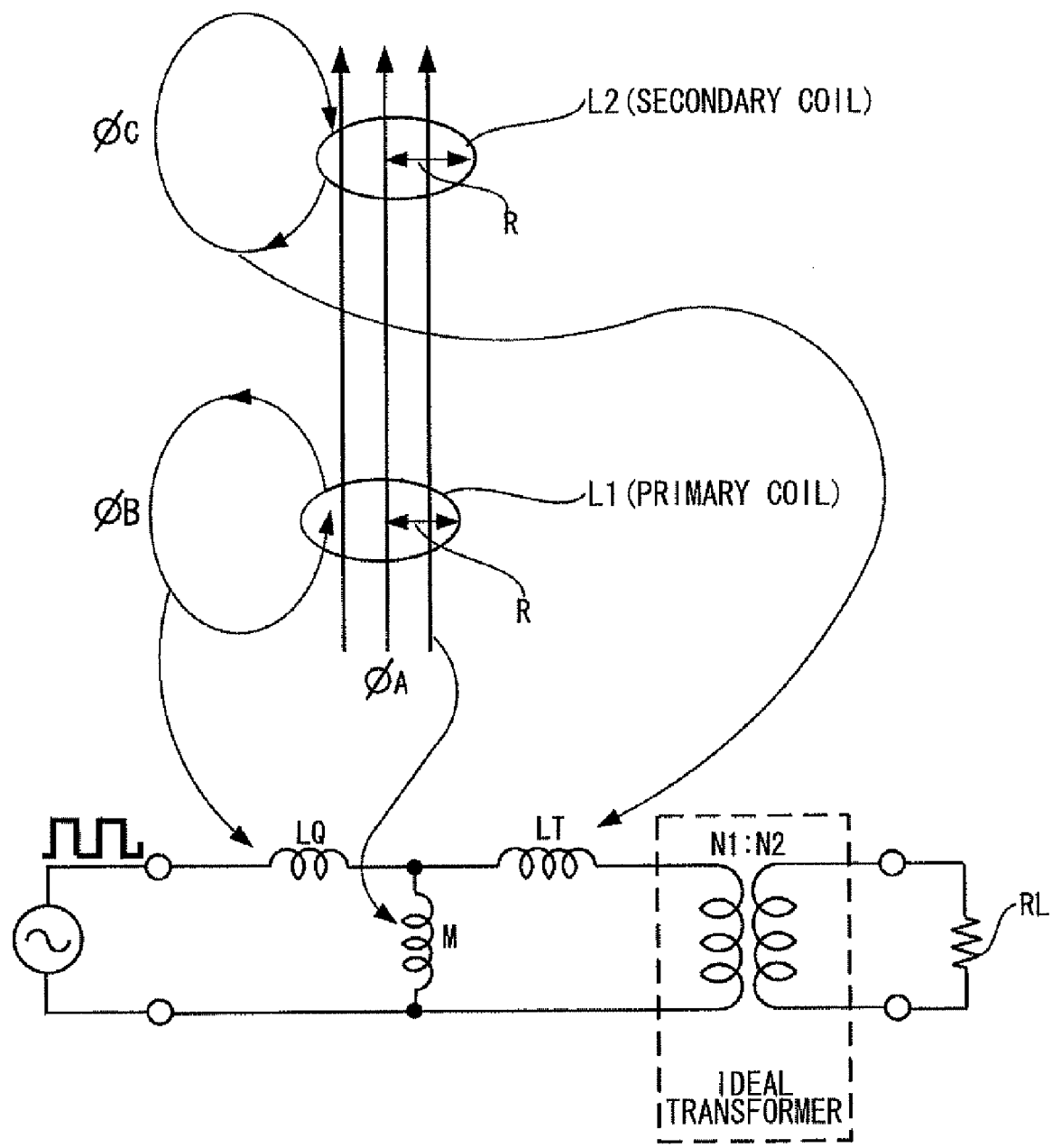
FIG. 8 is a view illustrative of the concept of a leakage inductance in a transformer formed by electromagnetically coupling a primary coil and a secondary coil.

FIG. 8 is a view illustrative of the concept of a leakage inductance in a transformer formed by electromagnetically coupling the primary coil and the secondary coil. The upper part of FIG. 8 shows the state of a magnetic flux between the coils disposed adjacently, and the lower part of FIG. 8 shows an equivalent circuit of the transformer.

In FIG. 8, the primary coil (L1) and the secondary coil (L2) are circular coils having a radius of R. When a magnetic flux (ϕA generated from the primary coil (L1) is interlinked to the secondary coil (L2), a current flows through the secondary coil (L2) due to mutual induction to cancel the magnetic flux of the primary coil (L1) so that the magnetic flux apparently becomes zero. Specifically, the mutual inductance M of the transformer ideally becomes zero.

However, a leakage magnetic flux (ϕB exists in the primary coil (L1), and a leakage magnetic flux ϕC exists in the secondary coil (L2). A primary-side leakage inductance LQ occurs due to the primary-side leakage magnetic flux ϕB, and a secondary-side leakage inductance LT occurs due to the secondary-side leakage magnetic flux ϕC. It is considered that an ideal transformer exists in theory. However, it is not related to the leakage inductance model and may be disregarded.

FIGS. 9A to 9D are views illustrative of the configuration and the operation of a harmonic resonant circuit. As shown in FIG. 9A, the harmonic resonant capacitor C2 is connected to the secondary coil (L2).

FIG. 9B show an equivalent circuit of the transformer in this case. The secondary-side load (RL) is not connected before power transmission. Since the mutual inductance is substantially zero, as described above, the mutual inductance can be disregarded.

Since the primary-side leakage inductance (LQ) and the secondary-side leakage inductance (LT) are connected in series, the composite inductance of the primary-side leakage inductance (LQ) and the secondary-side leakage inductance (LT) is (LQ+LT). Therefore, the equivalent circuit of the transformer can be modified as shown in FIG. 9C.

As shown in FIG. 9C, two resonant circuits SY1 and SY2 are formed. The following description focuses only on the resonant circuit SY2 while disregarding the resonant circuit SY1. FIG. 9D shows odd-order harmonics of the drive frequency (fd) of the drive signal (VD) of the primary coil (L1). The following description focuses on the fifth-order harmonic (5fd) (note that the harmonic is not limited thereto).

In this embodiment, the capacitance of the capacitor C2 is set so that the resonance frequency fs of the resonant circuit SY2 coincides with the fifth-order harmonic (5fd) of the drive frequency of the primary coil (L1), as indicated by an expression shown in FIG. 9E. Therefore, the resonant circuit SY2 is a harmonic resonant circuit that resonates with the fifth-order harmonic of the drive frequency of the primary coil Therefore, the equivalent circuit shown in FIG. 9C has resonance characteristics shown in FIG. 9E. The harmonic resonance peak is obtained at a position 5fd on the frequency axis. In this case, $fs=5fd=1/\{2\pi(LQ+LT)\cdot C2)\}^{1/2}$ is satisfied. In the above expression, fs indicates the resonance frequency, and 5fd indicates the fifth-order harmonic.

As described above, a leakage inductance is an inductance produced by a leakage magnetic flux that does not undergo interlinkage. The amount of leakage magnetic flux differs depending on the relative positional relationship between the primary coil (L1) and the secondary coil (L2).

Therefore, when the capacitance of the capacitor C2 of the harmonic resonant circuit SY2 described with reference to FIG. 9 is set taking into account the leakage inductance when the position of the primary coil coincides with the position of the secondary coil, the harmonic resonant circuit SY2 undergoes harmonic resonance when the position of the primary coil coincides with the position of the secondary coil, for example. When the capacitance of the capacitor C2 is set taking into account the leakage inductance when the position of the primary coil coincides with the position of the secondary coil, the harmonic resonant circuit SY2 undergoes harmonic resonance when the position of the primary coil (L1) coincides with the position of the secondary coil (L2).

Figure 10A:
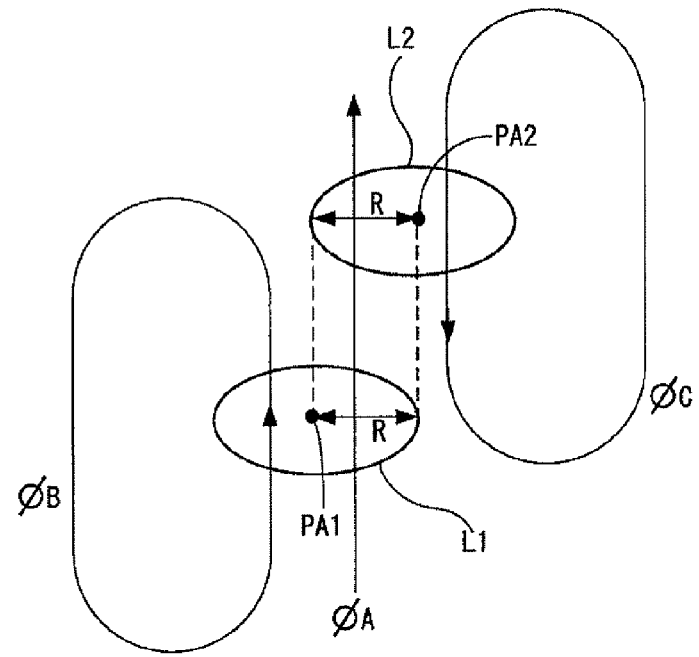
FIGS. 10A and 10B are views illustrative of a harmonic resonant circuit that resonates when a primary coil and a secondary coil are positioned at a given distance R.
Figure 10B:
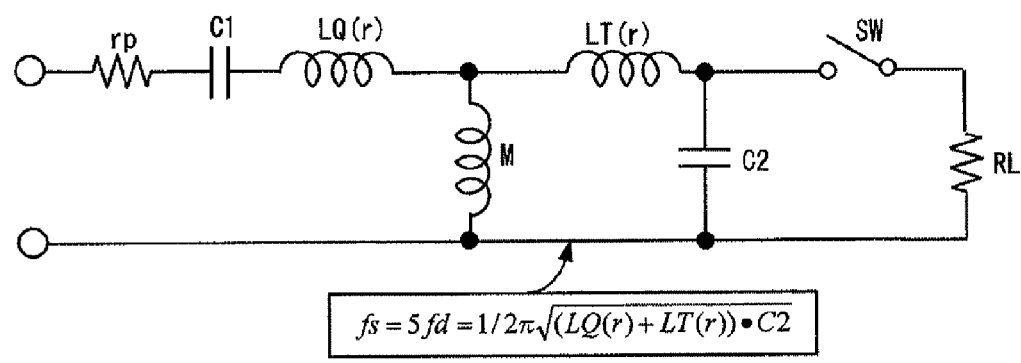

FIGS. 10A and 10B are views illustrative of a harmonic resonant circuit that resonates when the primary coil and the secondary coil are positioned at a given distance R. As shown in FIG. 10A, when the capacitance of the capacitor C2 is set taking into account the leakage inductances (φB and φC) when the distance between the center of the primary coil (L1) and the center of the secondary coil (L2) is R, the harmonic resonant circuit SY2 undergoes harmonic resonance when the primary coil (L1) and the secondary coil (L2) are positioned at a given distance R.

As shown in FIG. 10B, when the leakage inductances when the primary coil (L1) and the secondary coil (L2) are positioned at the given distance R are referred to as LQ(r) and LT(r), the harmonic resonant circuit SY2 undergoes harmonic resonance when the primary coil (L1) and the secondary coil (L2) are positioned at the given distance R by setting the capacitance of the capacitor C2 to satisfy the expression shown in FIG. 10B.

Figure 11A:
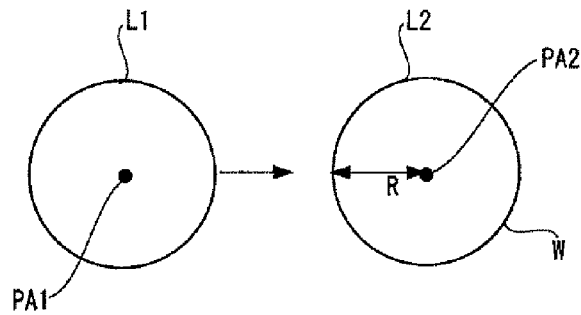
FIGS. 11A to 11D are views illustrative of a position at which the harmonic resonance peak is obtained when scanning a primary coil with respect to a secondary coil.

FIGS. 11A to 11D are views illustrative of a position at which the harmonic resonance peak is obtained when scanning the primary coil with respect to the secondary coil. As shown in FIG. 11A, the center of the primary coil (L1) is referred to as PA1, and the center of the secondary coil (L2) is referred to as PA2.

Figure 11B:
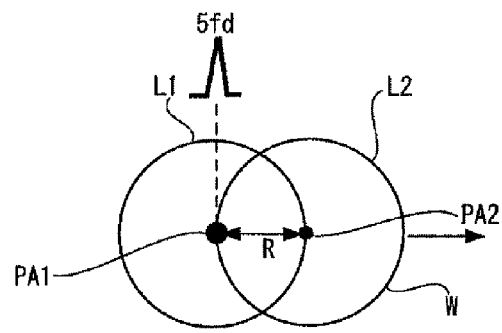
Figure 11C:
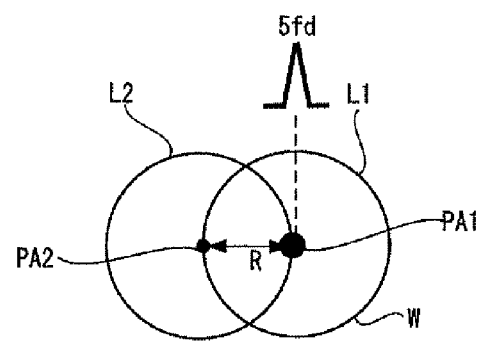

As shown in FIG. 11A, the primary coil (L1) is scanned linearly from the left toward the secondary coil (L2). In this case, the harmonic resonance peak is obtained when the primary coil (L1) approaches the secondary coil (L2) so that the distance between the primary coil (L1) and the secondary coil (L2) is R, as shown in FIG. 11B. The harmonic resonance peak is also obtained when the primary coil (L1) moves away from the secondary coil (L2), as shown in FIG. 11C.

Figure 11D:
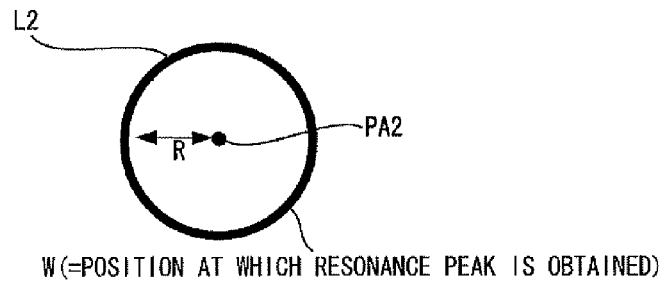

When the primary coil (L1) is scanned along an arbitrary axis that intersects the secondary coil (L2) in a stationary state, the resonance peak is obtained at a position on a circumference at a distance R from the center PA2 of the secondary coil (L2), as shown in FIG. 11D. Specifically, when a position at which the harmonic resonance peak is obtained is referred to as W, the position W coincides with the outermost circle of the secondary coil (L2).

Figure 12:
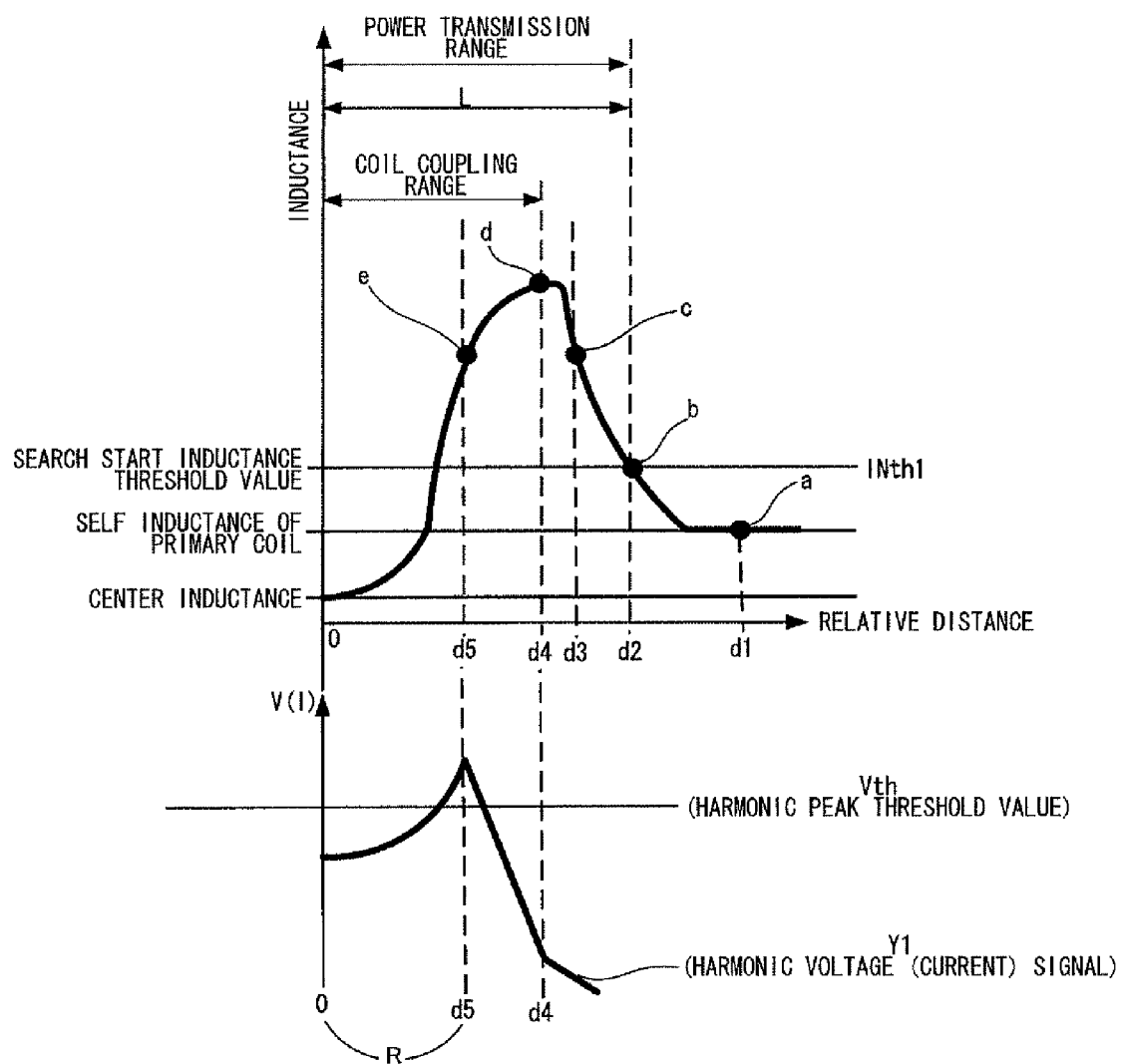
FIG. 12 is a view showing an example of a change in inductance of a primary coil and an example of a change in harmonic voltage obtained from a harmonic detection circuit when a primary coil approaches a secondary coil.

FIG. 12 is a view showing an example of a change in the inductance of the primary coil and an example of a change in the harmonic voltage obtained from the harmonic detection circuit when the primary coil approaches the secondary coil.

The upper part of FIG. 12 is the same as FIG. 7. As shown in the lower part of FIG. 12, the harmonic resonance peak is obtained by the harmonic detection circuit 25 when the distance between the primary coil and the secondary coil is R (=relative distance d5). Therefore, the harmonic peak can be detected by comparing the output from the harmonic detection circuit 25 with a harmonic peak detection threshold voltage (V2).

As described with reference to FIG. 7, the approach of the secondary coil can be detected by a decrease in coil end voltage (coil current) due to an increase in the inductance of the primary coil when the distance between the center of the primary coil and the center of the secondary coil is L (=relative distance d2). As shown in FIG. 12, the distance R (distance at which the harmonic resonance peak occurs) is shorter than the distance L (approach detection distance) (R<L).

Specifically, a situation in which the secondary coil has approached the primary coil within the distance L is detected by approach detection, and a situation in which the primary coil and the secondary coil have been positioned at the distance R is detected by the harmonic detection.

Note that the distance R may be zero (R=0). Specifically, when harmonic resonance has occurred when R=0 (i.e., when the center of the primary coil coincides with the center of the secondary coil), the primary coil and the secondary coil can be positioned by manually moving the primary-side instrument using the harmonic peak as an index, or removal (leave) of the secondary-side instrument can be detected depending on the presence or absence of the harmonic peak. Note that it is necessary to set the distance R at R>0 when performing an orthogonal two-axis search described below.

Secondary coil position detection utilizing orthogonal two-axis search

Figure 13:
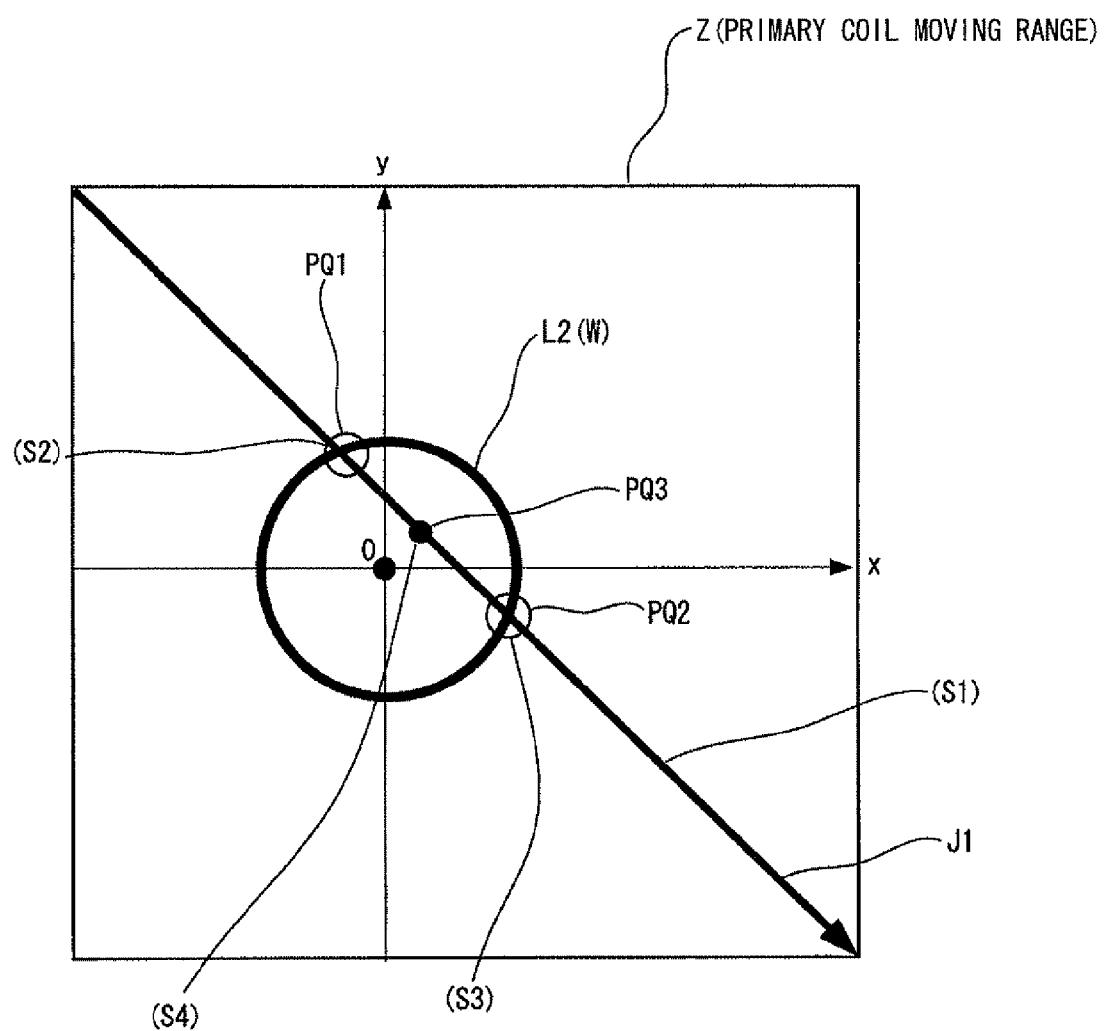
FIG. 13 is a view illustrative of a secondary coil position detection method and a positioning method utilizing an orthogonal two-axis search.
Figure 14:
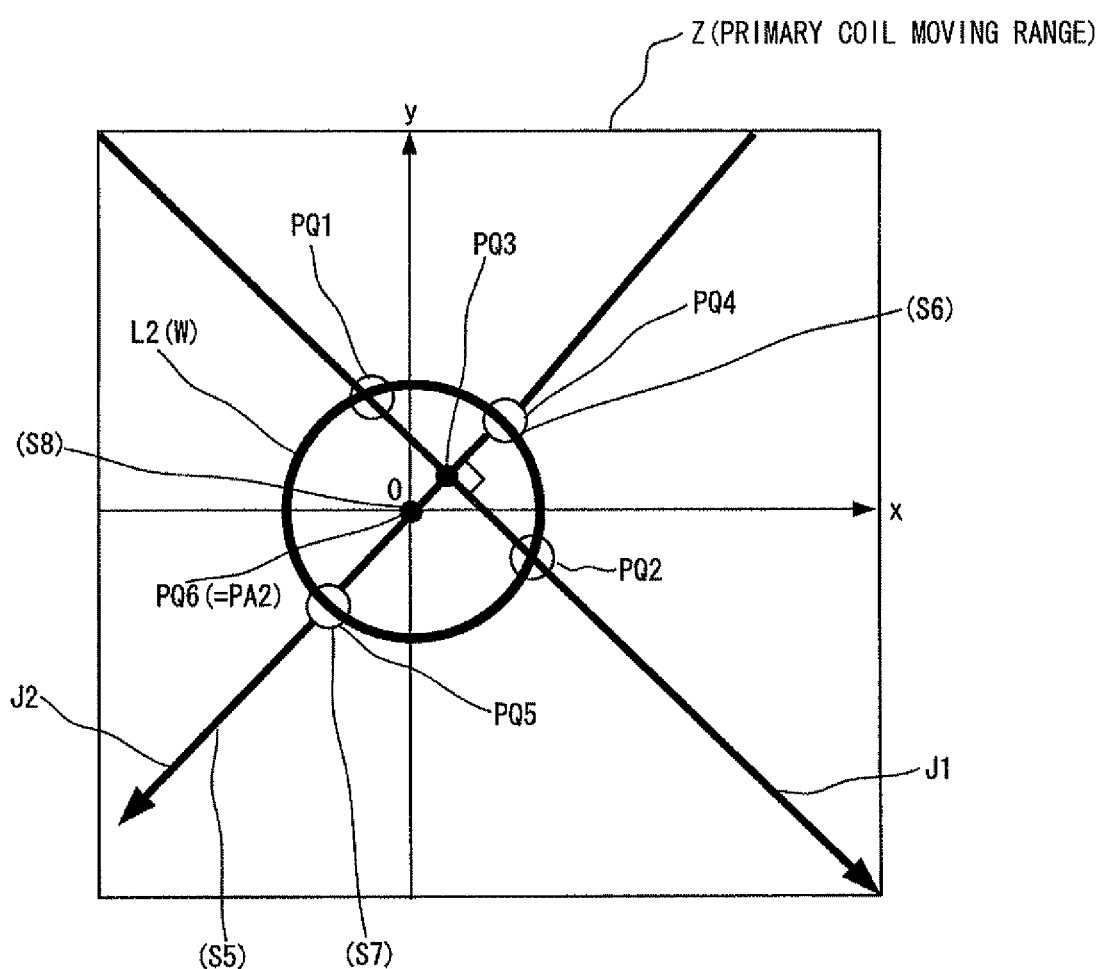
FIG. 14 is a view illustrative of a secondary coil position detection method and a positioning method utilizing an orthogonal two-axis search.
Figure 15:
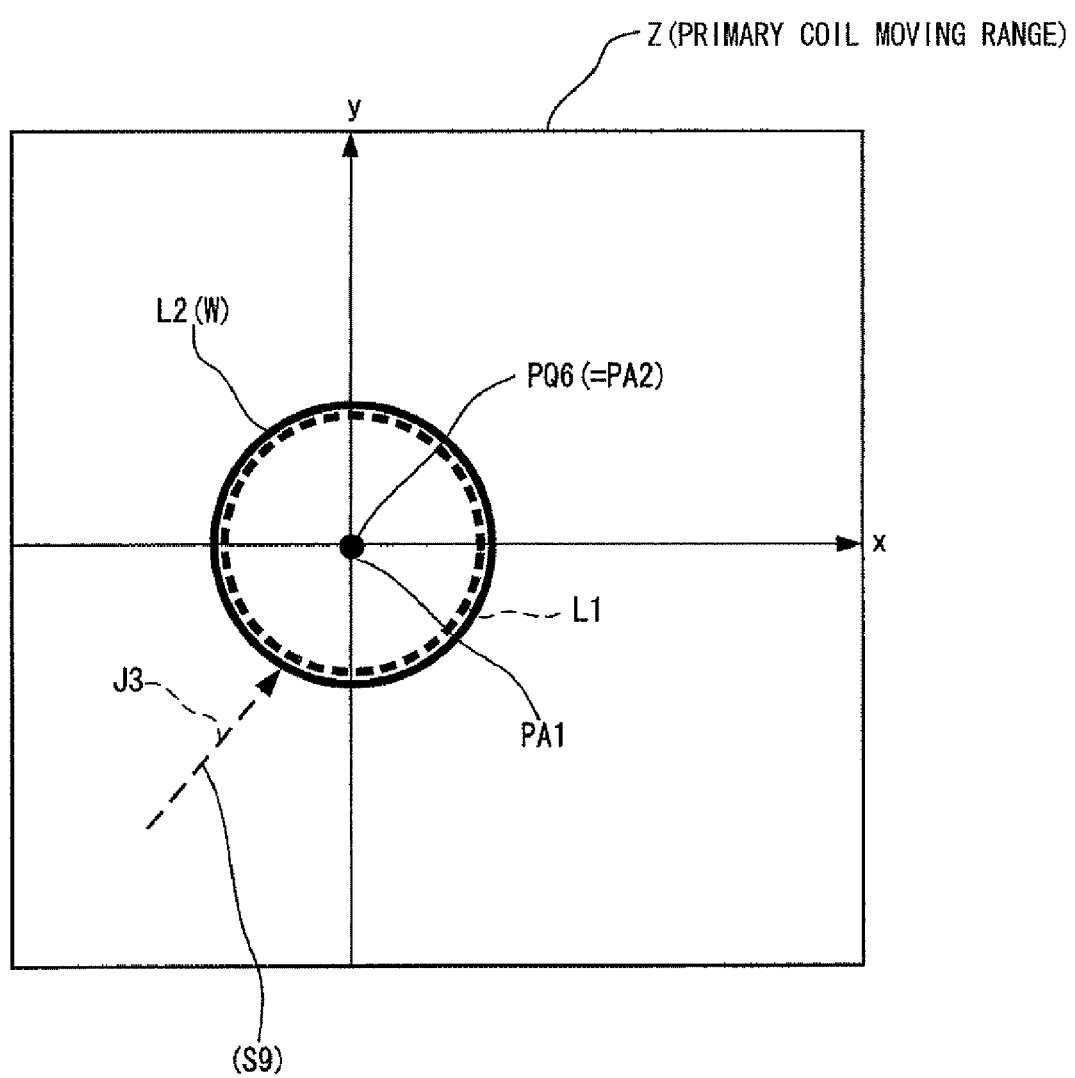
FIG. 15 is a view illustrative of a secondary coil position detection method and a positioning method utilizing an orthogonal two-axis search.

Secondary coil position detection utilizing an orthogonal two-axis search is described below with reference to FIGS. 13 to 16. FIGS. 13 to 15 are views illustrative of a secondary coil position detection method and a positioning method utilizing an orthogonal two-axis search.

In FIG. 13, the secondary coil (L2) is placed in a primary coil moving range Z. If the range in which the secondary-side instrument 510 is placed is limited to an area Z1 of which the color differs from the remaining area (see FIG. 1), for example, the secondary coil (L2) is necessarily placed in the primary coil moving range.

The approach of the secondary coil (L2) can be detected by intermittently driving (moving) the primary coil, as described above. Therefore, the power-transmitting-side control circuit 22 shown in FIG. 2 causes the actuator control circuit 37 to perform an orthogonal two-axis search for detecting the position of the secondary coil. The details are described below.

An XY plane determined by XY axes is set as shown in FIG. 13. The calculation circuit 35 shown in FIG. 2 calculates the coordinate position in the XY plane. The primary coil (L1) and the secondary coil (L2) are circular coils having a radius of R. The harmonic peak is obtained when the distance between the centers (PA1 and PA2) of the primary coil (L1) and the secondary coil (L2) is R.

As shown in FIG. 13, the actuator control circuit 37 drives actuators 720 and 730 to move the primary coil (L1) along a first axis (J1) that intersects the secondary coil to perform a first scan for detecting the position of the secondary coil (step (S1)).

A harmonic resonance peak occurs at two points PQ1 and PQ2 (step (S2) and step (S3)). The calculation circuit 35 calculates the coordinates PQ3 of the midpoint of a line segment that connects the two points PQ1 and PQ2 (step (S4)).

As shown in FIG. 14, the actuator control circuit 37 then drives the actuators 720 and 730 to move the primary coil (L1) along a second axis (J2) that perpendicularly intersects the first axis (J1) and passes through the midpoint (PQ3) calculated by the first scan to perform a second scan for detecting the position of the secondary coil (step (S5)). A harmonic resonance peak occurs at two points PQ4 and PQ5 (step (S6) and step (S7)). The calculation circuit 35 calculates the coordinates PQ6 of the midpoint of a line segment that connects the two points PQ4 and PQ5 (step (S8)).

The calculated coordinates PQ6 indicate the position of the center PA2 of the secondary coil (L2). Specifically, the center position of the secondary coil (L2) is thus calculated.

As shown in FIG. 15, the primary coil (L1) is moved in a direction J3 so that the center PA1 of the primary coil (L1) coincides with the center PA2 of the secondary coil (L2) (step (S9)). The primary coil and the secondary coil can thus be automatically positioned with very high accuracy.

Figure 16:
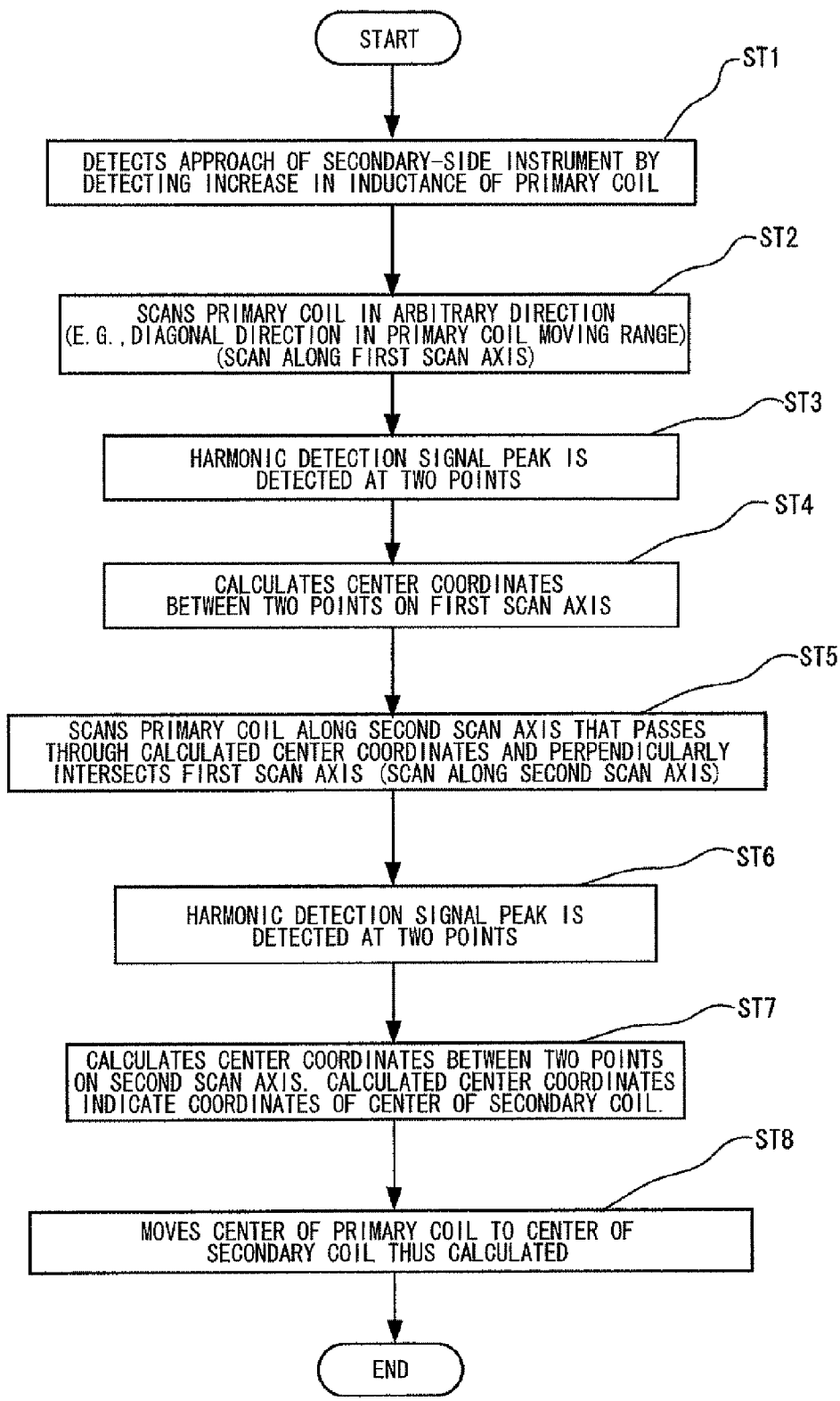
FIG. 16 is a flowchart showing a process of a secondary coil position detection method and a primary coil positioning method utilizing an orthogonal two-axis search.

FIG. 16 shows a summary of the above-described process. FIG. 16 is a flowchart showing the process of the secondary coil position detection method and the primary coil positioning method utilizing the orthogonal two-axis search. The flow shown in FIG. 16 also includes the secondary coil approach detection operation. Note that the approach detection operation is not indispensable, and may be omitted.

As shown in FIG. 16, the primary coil is intermittently driven to detect the approach of the secondary coil by detecting an increase in the inductance of the primary coil (step ST1). When it has been detected that the secondary-side instrument has been placed in a given area (i.e., the approach of the secondary coil has been detected), the first scan is performed along the first scan axis (step ST2).

A harmonic detection signal peak (harmonic resonance peak) is obtained at two points by the first scan (step ST3). The coordinates of the midpoint of a line segment that connects the two points are then calculated (step S54).

The second scan is then performed along the second scan axis that passes through the calculated center coordinates and perpendicularly intersects the first scan axis (step ST5). A harmonic detection signal peak (harmonic resonance peak) is obtained at two points by the second scan (step ST6).

The coordinates of the midpoint of a line segment that connects the two points determined by the second scan are then calculated (step ST7). The coordinates of the midpoint thus calculated indicate the coordinates of the center of the secondary coil (L2).

The center of the primary coil (L1) is moved to the center of the secondary coil thus calculated (step ST8). The primary coil (L1) and the secondary coil (L2) are positioned in this manner.

Configuration Example and Operation of XY Stage

Figure 17:
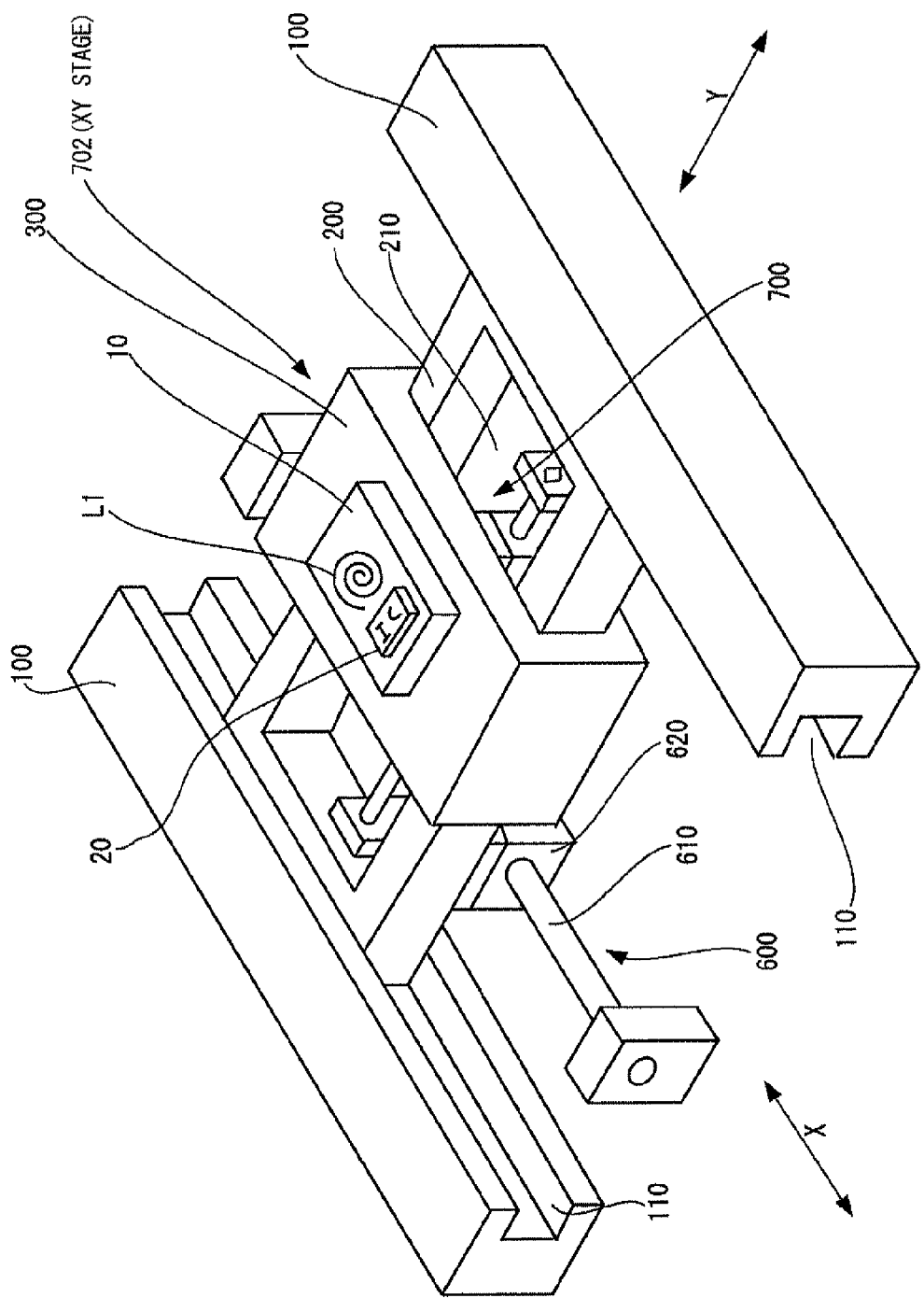
FIG. 17 is a perspective view showing the basic configuration of an XY stage.

An example of the configuration of the XY stage and the operation of the XY stage are described below. FIG. 17 is a perspective view showing the basic configuration of the XY stage.

As shown in FIG. 17, an XY stage 702 includes a pair of guide rails 100, an X-axis slider 200, and a Y-axis slider 300. Aluminum, iron, granite, a ceramic, or the like is used as the material for these members.

The guide rails 100 respectively have guide grooves 110 opposite to each other The guide rails 100 extend in parallel in the X-axis direction. The guide rails 100 are secured on a surface plate (not shown).

The X-axis slider 200 engages the guide rails 100. The X-axis slider 200 is in the shape of a rectangular flat plate. The ends of the X-axis slider 200 are fitted into the guide grooves 110 so that the X-axis slider 200 can be moved in the X-axis direction along the guide grooves 110, but cannot be moved in the Y-axis direction. Therefore, the X-axis slider 200 can be reciprocated in the X-axis direction along the guide rails 100.

Note that the guide groove 110 formed in the guide rail 100 may be formed in the X-axis slider 200, and the guide rail 100 may have a protrusion that is fitted into the guide groove formed in the X-axis slider 200. It suffices that the engagement portion of the guide rail 100 and the X-axis slider 200 be supported on three sides. The shape of the guide groove is not particularly limited.

The Y-axis slider 300 is provided to enclose the X-axis slider 200. The Y-axis slider 300 has a cross-sectional shape (almost in the shape of the letter U) corresponding to the cross-sectional shape of the X-axis slider 200 in the shape of a rectangular flat plate. The end of the Y-axis slider 300 almost in the shape of the letter U is bent inward. The upper part of the Y-axis slider 300 may be open. Alternatively, the Y-axis slider 300 may have a cross-sectional shape having no opening.

The ends of the X-axis slider 200 in the widthwise direction that engage the guide grooves 110 are thus supported by the Y-axis slider 300 on the upper side, the side, and the lower side. Since the Y-axis slider 300 is secured on the X-axis slider 200, the movement of the Y-axis slider 300 in the X-axis direction with respect to the N-axis slider 200 is prevented. When the X-axis slider 200 is moved in the N-axis direction, the Y-axis slider 300 moves in the X-axis direction together with the X-axis slider 200. The Y-axis slider 300 can be moved in the Y-axis direction with respect to the N-axis slider 200. The X-axis slider 200 functions as an X-axis direction moving member, and also serves as a guide that allows the Y-axis slider 300 to move in the Y-axis direction with respect to the X-axis slider 200. The upper part of the Y-axis slider 300 serves as a top plate (movable main surface) on which an object that is moved along the NY axes is placed.

As shown in FIG. 17, the power transmission device 10 including the primary coil (circular wound coil) L1 and the power transmission control device 20 (IC) is provided on the main surface (top plate) of the Y-axis slider 300. When the primary coil L1 is a wound coil, the volume and the height of the coil can be reduced. This is advantageous when scanning the primary coil L1. Note that the type of the primary coil is not limited to the above-described example.

The XY stage 702 shown in FIG. 17 utilizes a highly accurate linear motor as a drive source. A ball screw mechanism may be used instead of the linear motor.

An X-axis linear motor 600 that moves the X-axis slider 200 is provided between the pair of guide rails 100. A movable member 620 of the X-axis linear motor 600 secured on a rod-shaped stator 610 is secured on the lower part of the X-axis slider 200 so that the X-axis slider 200 can be reciprocated.

The Y-axis slider 300 is reciprocated by a Y-axis linear motor 700. A depression 210 is formed in the X-axis slider 200, and the Y-axis linear motor is placed in the depression 210. Therefore, the stage height can be reduced.

The X-axis linear motor 600 and the Y-axis linear motor 700 respectively correspond to the X-direction actuator 720 and the Y-direction actuator 730 shown in FIG. 2.

The power-transmitting-side device (i.e., the primary-side structure of the non-contact power transmission system) 704 is formed by placing the power transmission device 10 including the primary coil (circular wound coil) L1 and the power transmission control device 20 (IC) on the XY stage 702.

As shown in FIG. 1B, the power-transmitting-side device 704 is provided in a structure (e.g., desk) having a flat surface, for example. This implements the power-transmitting-side device 704 that deals with a next-generation non-contact power transmission system capable of automatically moving the position of the primary coil in the XY plane corresponding to the position of a secondary coil of a secondary-side instrument (e.g., portable terminal) placed at an approximate position.

As described above, the power transmission control device 20 according to this embodiment intermittently drives the primary coil, and always monitors whether or not the coil end voltage (current) has decreased due to an increase in primary-side inductance. When the approach of the secondary-side instrument (i.e., the secondary-side instrument has been placed in the given area Z1) has been detected, the position of the primary coil can be automatically adjusted Since the secondary-side instrument approach detection process and the primary coil position adjustment process are automatically performed, the user's workload is reduced. Note that the approach detection process may not be performed, or the position of the primary coil may be manually adjusted.

Although only some embodiments of the invention have been described in detail above, those skilled in the art would readily appreciate that many modifications are possible in the embodiments without materially departing from the novel teachings and advantages of the invention. Specifically, various modifications are possible without materially departing from the novel teachings and advantages of the invention.

Accordingly, such modifications are intended to be included within the scope of the invention. Any term (e.g., GND and portable telephone/charger) cited with a different term (e.g., low-potential-side power supply and electronic instrument) having a broader meaning or the same meaning at least once in the specification and the drawings can be replaced by the different term in any place in the specification and the drawings. Any combinations of the embodiments and the modifications are also included within the scope of the invention.

The configurations and the operations of the power transmission control device, the power transmitting device, the power reception control device, and the power receiving device, and the method of detecting the secondary-side load by the primary side instrument, are not limited to those described in the above embodiments. Various modifications and variations may be made.

According to at least one aspect of the invention, the following effects can be obtained, for example. Note that the following effects are not necessarily achieved at the same time. Accordingly, the following effects do not in any way limit the scope of the invention.

(1) Since the primary coil is automatically moved to an optimum position even if the secondary-side instrument is placed at an approximate position, appropriate power transmission is necessarily implemented.

(2) Since appropriate power transmission is necessarily implemented regardless of the size, shape, design, and the like of the secondary-side instrument, the versatility of the non-contact power transmission system is significantly improved.

(3) Since the degree of freedom of the design of the secondary-side instrument is not limited, a burden is not imposed on the manufacturer of the secondary-side instrument.

(4) Since the relative positional relationship between the coils is detected by effectively utilizing the circuit configuration of the non-contact power transmission system without using a special circuit (e.g., position detection element), the configuration does not become complicated and is easily implemented.

(5) The coil position can be detected with extremely high accuracy utilizing the harmonic resonance of the drive frequency of the primary coil.

(6) A power receiving device having a novel configuration that implements harmonic resonance is obtained.

(7) A novel secondary coil position detection method and a novel primary coil positioning method utilizing the resonance of an odd-order harmonic of the drive frequency of the primary coil are obtained.

(8) A highly versatile and convenient next-generation non-contact power transmission system can be implemented that enables the position of the primary coil to be automatically adjusted to enable charging or the like merely by placing a portable terminal or the like in a given area of a structure (e.g., desk) having a flat surface.

The invention achieves an effect of providing a next-generation non-contact power transmission system with significantly improved versatility and convenience. Therefore, the invention is useful for a power transmission control device (power transmitting control IC), a power transmitting device (e.g., IC module), a power receiving device, a non-contact power transmission system, an electronic instrument, a secondary coil position detection method, a primary coil positioning method, and the like.

What is claimed is:

1. A power transmission control device that controls power transmission of a power transmitting device of a non-contact power transmission system, the non-contact power transmission system transmitting power from the power transmitting device to a power receiving device via non-contact power transmission through a primary coil and a secondary coil that are electromagnetically coupled, the power transmission control device comprising:

a power-transmitting-side control circuit that controls power transmission to the power receiving device;

a calculation circuit that calculates the position of the secondary coil by performing given calculations;

an actuator control circuit that controls the operation of an actuator, the actuator moving the position of the primary coil in an XY plane, the actuator control circuit scanning the primary coil to detect the position of the secondary coil; and a waveform monitoring circuit that monitors a waveform of a signal provided from the primary coil, a harmonic detection circuit outputting an mth-order harmonic signal of a drive frequency of the primary coil, wherein m is an odd number greater than 1, the calculation circuit performing the given calculations based on the mth-order harmonic signal acquired by scanning of the primary coil to detect the position of the secondary coil to determine the position of the secondary coil, and the actuator control circuit moving the primary coil so that the position of the primary coil coincides with the calculated position of the secondary coil.

2. The power transmission control device as defined in claim 1, the power transmission control device including a harmonic detection circuit that detects a harmonic signal of a drive frequency of the primary coil;

a resonant circuit that resonates with a harmonic of the drive frequency of the primary coil being formed when the primary coil and the secondary coil are electromagnetically coupled in a state in which a center of the primary coil and a center of the secondary coil are positioned at a given distance, the harmonic detection circuit detecting a resonance peak of the harmonic of the drive frequency of the primary coil due to the resonance of the resonant circuit; and the calculation circuit performing the given calculations based on coordinate position data when the resonance peak of the harmonic has been obtained from the harmonic detection circuit to calculate the position of the center of the secondary coil.

3. The power transmission control device as defined in claim 2, the primary coil and the secondary coil being circular coils;

the actuator control circuit driving the actuator to move the primary coil along a first axis that intersects the secondary coil to perform a first scan to detect the position of the secondary coil;

the calculation circuit calculating the coordinates of a midpoint of a line segment that connects two points at which the peak of a detection signal of the harmonic detection circuit is obtained during the first scan;

the actuator control circuit driving the actuator to move the primary coil along a second axis that perpendicularly intersects the first axis and passes through the midpoint calculated during the first scan to perform a second scan to detect the position of the secondary coil;

the calculation circuit calculating the coordinates of the midpoint of the line segment that connects two points at which the peak of the detection signal of the harmonic detection circuit is obtained during the second scan; and the actuator control circuit driving the actuator to move the primary coil so that the position of the center of the primary coil coincides with the position of the midpoint calculated during the second scan.

4. The power transmission control device as defined in claim 2, further comprising:

a capacitor connected to the secondary coil, a capacitance of the capacitor being set so that a resonant circuit that resonates with the harmonic of the drive frequency of the primary coil is formed by the capacitor and a leakage inductance when the center of the primary coil and the center of the secondary coil are positioned at a given distance, and the harmonic detection circuit detecting the resonance peak of the harmonic of the drive frequency of the primary coil due to the resonance of the resonant circuit.

5. The power transmission control device as defined in claim 1, further comprising:

an approach detection circuit that generates an approach detection signal based on a coil end voltage or a coil current of the primary coil, the approach detection signal indicating that the secondary coil has approached the primary coil, the actuator control circuit performing a scan for detecting the position of the secondary coil when an approach of the secondary coil has been detected based on the approach detection signal.

6. The power transmission control device as defined in claim 5, the secondary coil being a secondary coil provided with a magnetic material; and when the inductance of the primary coil has increased due to the approach of the secondary coil provided with the magnetic material and the coil end voltage or the coil current when driving the primary coil at a given frequency has decreased so that the approach detection signal has reached a given threshold value, the actuator control circuit performing the scanning to detect the position of the secondary coil.

7. The power transmission control device as defined in claim 5, the power-transmitting-side control circuit intermittently driving the primary coil at the given frequency in order to detect the approach of the secondary coil.

8. A power transmitting device comprising:

the power transmission control device as defined in claim 1; and the primary coil.

9. A non-contact power transmission system comprising:

the power transmitting device as defined in claim 8; and a power receiving device comprising:

the secondary coil; and a capacitor connected to the secondary coil, a capacitance of the capacitor being set so that a resonant circuit that resonates with a harmonic of a drive frequency of the primary coil is formed by the capacitor and a leakage inductance when a center of the primary coil and a center of the secondary coil are positioned at a given distance R, wherein R is greater than or equal to 0.

* * * * *